(12) United States Patent
Ly et al.

(10) Patent No.: US 7,216,094 B2
(45) Date of Patent: May 8, 2007

(54) WEB VEHICLE ORDERING SYSTEM

(75) Inventors: Kelly Ly, Plymouth, MN (US); Lev Buslovich, Eden Prairie, MN (US)

(73) Assignee: Gelco Corporation, Eden Prairie, MN (US)

( * ) Notice: Subject to any disclaimer, the term of this patent is extended or adjusted under 35 U.S.C. 154(b) by 345 days.

(21) Appl. No.: 10/013,168

(22) Filed: Dec. 10, 2001

(65) Prior Publication Data

US 2002/0178080 A1 Nov. 28, 2002

Related U.S. Application Data

(60) Provisional application No. 60/293,318, filed on May 24, 2001.

(51) Int. Cl.
*G06Q 30/00* (2006.01)
(52) U.S. Cl. .......................................... 705/26; 705/27
(58) Field of Classification Search ............. 705/26–27
See application file for complete search history.

(56) References Cited

U.S. PATENT DOCUMENTS 6,167,383 A * 12/2000 Henson ........................ 705/26
6,609,108 B1 * 8/2003 Pulliam et al. ............... 705/27

OTHER PUBLICATIONS

PRN: "GE Captial Fleet Services Launches Driver-Based Vehicle Ordering Application," PR Newswire, Dec. 15, 1999, 2pgs, Proquest #47240650.*

CST: "Ford Testing New Engine with Cleaner Emissions," Chicago Sun Times, Aug. 26, 1992, 3pgs, Proquest #114374627.*
Candler, Julie; "Vehicle Leasing: Plenty of Options," Nation's Business, May 1991, v79n5p. 27, 5pgs, Proquest #655597.*
PR Newswire; "GE Capital Fleet Services Achieves $3 Million Per Day in Online Transactions," Nov. 30, 1999, 2pgs, Proquest #46742856.*
UU: Frook, John; "GE Fleet Going Virtual," B to B, 10 April 200, v85n3p. 8, 3pgs, Proquest #52606137.*
GE Capital Fleet: Internet Archive Wayback Machine, www.archive.org; www.gefleet.com; Oct. 13, 1999, Jan. 30, 2000; 3pgs.*
Star Tribue; "Big 3 to sell cleaner cars for model year 1999" Feb. 5, 1998, Proquest #57617277, 2pgs.*

(Continued)

*Primary Examiner*—Robert M. Pond
(74) *Attorney, Agent, or Firm*—Dorsey & Whitney LLP

(57) ABSTRACT

The present invention comprises a system for ordering vehicles through the internet for addition to a vehicle fleet. The system includes a first portion of the invention for use by a fleet manager to price and configure vehicles, for reporting, for checking the status of orders, and for managing the driver accessible portion of the present invention. A second portion of the present invention allows the fleet manager to set up the specifications of the system, to set up notifications to the drivers, to set up driver profiles, to approve and submit orders, as well as other options. The third portion of the present invention system allows an individual driver to order and re-order leased vehicles within the environment set up by the fleet manager and to dispose of old vehicles.

17 Claims, 37 Drawing Sheets

OTHER PUBLICATIONS

Dell: Internet Archive Wayback Machine; www.archive.org; www.dell.com; Oct. 8, 1997; 2pgs.*

Dell: Internet Archive Wayback Machine; www.archive.org; www.dell.com; Oct. 7, 1997, 1pg.*

Dell: Internet Archive Wayback Machine; www.archive.org; www.dell.com; Oct. 7, 1997, 2pgs.*

Dell: Internet Archive Wayback Machine; www.archive.org; www.dell.com; Aug. 16, 2000; 2pgs.*

Dell: Internet Archive Wayback Machine; www.archive.org; www.dell.com; Dec. 12, 1998, 1pg.*

Wylie, Ian; "Drivers who have come to the ende of the perk road," The Guardian, Oct. 23, 1993, Proquest 69411429,3pgs.*

Galea, Christine; "Driving down costs," Sales & Marketing Management, May 2000, v152n5pp. 102-110, Dialog file 15 #02019656, 6pgs.*

* cited by examiner

GE Capital Fleet Services

Vehicle Ordering

Exit | Contact Us | Help | Account Info

Main Menu ▽

Welcome Kelly Ly

The GE Capital Fleet Services Vehicle Configuration and Ordering System is a powerful computer application linking several databases and automating numerous tasks. It is simple to use and it will be a dynamic component in our ongoing efforts to serve your commercial vehicle fleet management needs.

Pricing & Config. ~24
Ordering ~26
Rapid Factory Order ~28
Client Located Stock ~30
GE Located Stock ~32
Driver Order Mgmt. ~34
Fleet Specs ~36
Order Status ~38
Volume Incentive
Preferences
Reports ~40
Hold Order
Body Company Specs
Bailment Orders
Change Password ~42
About

First Visit?

- Move your mouse over each selection to see an explanation of that section of Vehicle Ordering.
- Click on the main menu item to access your destination. For assistance with any of these applications call 1-800-469-0044.

Your facto
Please not
Built-Out
vehicle ma
Configuat
'General

Refer to
Outs locat
Bulletins"
@ Fleet.

FIG. 1

GE Capital Fleet Services

Exit | Contact Us | Help | Account Info

Vehicle Ordering

◀◀ Prev. | Configuration Menu ▽ | Next ▶▶

LoginId: kly2 Corp: 01 Fleet: 007777

**To create a new Configuration go to Option 1
or to use an existing configuration, go to Option 2**

① New Configuration

☐ Skip Vehicle Color Page

☐ Auto Select Emissions *Requires vehicle garaging address*

○ Build a car or light truck spec from scratch

② Existing Configuration

☐ Skip Vehicle Options Page

☐ Auto Select Emissions *Requires vehicle garaging address*

Configuration Method: Configuration # Year

[ ▽ ] [         ] [2001 ▽] [Search]

*FIG. 2*

Vehicle Ordering

GE Capital Fleet Services

Exit | Contact Us | Help | Account Info | Vehicle Info    [◀◀ Prev.]  Option Selection ▽ [Next ▶▶]
LoginId: kly2 Corp: 01 Fleet: 007777 Vehicle: 2002 Dodge RskH52 Caravan Fwd Passenger
[Expert Entry] [Show Package Contents] [Show MSRP Price] [Show Rules]

Total Invoice Price:   $22,623

[Option Category ▽]

General Model Information
  This Model Can Be Factory Ordered.
  Model Last Updated Date: 05/30/2001
  Est. Manufacturer Final Order Date: N/A
  Estimated Factory Order Lead Time: N/A
  ☐ Model Pricing: Estimated.
  ☐ Estimated Plant Production Startup: 08/06/2001
  ☐ Estimated Plant Production Startup: 07/16/2001
  Mfr. Veh. Order Guide: 06/01/01

Engines [Req'd]
  ☑         Engine: 3.3L V6 SMPI                           N/C
Transmission [Req'd]
  ☑         Transmission: 4-Speed Automatic (41Te/41Ae)    N/C
Quick Order Packages [Req'd]
     ☐ 25F    Quick Order Package 25F                      N/C
  ☐ ☐ 25H    Quick Order Package 25F                       $950
Suspension
     ☐ SDB    Heavy Duty Suspension                        $559
Option Packages
     ☐ XAP    Power Adjustable Pedals                      N/A
  ☐ ☐ ADK    Sport Touring Group                           $766
Tires: Spare
     ☐ TBB    Tire: Full Size Spare                        $141
Radios
  ☐ ☐ RBU    Radio: AM/FM W/Cassette/CD/Rear Audio         N/A
     ☐ RAZ    Radio: AM/FM Cassette/CD/Equalizer           $198
     ☐ RCE    Infinity Speaker System                      $436
  ☐ ☐ RDW    4 Disc In Dash CD Changer                     $612

FIG. 4

Interior Colors [Req'd]
- ☐ E7**     Cloth Low-Back Bucket Seats     N/A
- ☐ L5**     Cloth High-Back Bucket Seats     N/C

Exterior Colors - Primary [Req'd]
- ☑ P**     Monotone Paint Application     N/C

Seating/Passenger Capacity

| | | |
|---|---|---|
| ☐ CYX | 1st & 2nd Rear Commercial Seats Delete | $-176 |
| ☐ CF8 | 1st Rear Commercial Seats Delete | $-110 |
| ☐ CF9 | 2nd Rear Commercial Seats Delete | $-110 |
| ☐ CYG | Quad Buckets w/3rd Row Split Bench | N/A |
| ☐ CYL | Quad Buckets w/1 Child Seat/3rd Row Split Bench | $110 |
| ☐ CYR | 2nd Row Deluxe Bench w/2 Child Seats | $198 |
| ☐ CYS | Quad Buckets w/3rd Row Bench | $656 |
| ☐ CYT | Quad Buckets w/1 Child Seat/3rd Row Bench | $766 |

Seat Styles/Seating Arrangements
- ☐ JPR     8-Way Power Driver Seat     $326
- ☐ JPR     8-Way Power Driver Seat (Fleet)     $326

Manufacturer Incentives
- ☐ -     Fleet Incentive     $-1250
- ☐ 3GD     Group Fund Delete     $-200

Emissions    ☑ Open Emissions   Select to leave emissions open until ordering
- ☐ NAS     50 State Emissions     N/C

Doors
- ☐ JRA     Right Power Sliding Door     $352
- ☐ GXR     Keyless Entry System w/2 Transmitters     $200

Safety/Security Equipment
- ☐ BGF     Anti-Lock Brakes     $497
- ☐ LSA     Security Alarm     $172
- ☐ LSA     Security Alarm (Fleet)     $172
- ☐ CGS     Supplemental Side Air Bags     $343

Other Options
- ☐ YEP     Manufacturer's Statement of Origin     N/C
- ☐ NHK     Engine Block Heater     $31
- ☐ NMC     HD Engine Cooling     $154
- ☐ MWG     Roof Rack     $220
- ☐ LMN     Park/Turn Daytime Running Lamps     $35
- ☐ XEA     Tow Hooks     N/A

*FIG. 5*

- Volume Seats Folded, 144.9 Cu. Ft. Maximum Cargo:
- Volume:
- 4,057 Lbs. Curb Weight, 5,400 Lbs. GVWR:
- Headroom: 39.7" Front, 39.8" Rear, 37.9" Third
- Hiproom: 57.2" Front, 67.8" Rear, 49.0" Third
- Legroom: 40.6" Front, 36.5" Rear, 33.8" Third
- Shoulder Room: 62.9" Front, 64.7" Rear, 62.0"
- Third:

Model, equipment and prices are subject to change by the manufacturer without notice. Prices do not include license and title fees or applicable tax.

[Convert to Order]

GE Capital Fleet Services

Vehicle Ordering

Exit | Contact Us | Help | Account Info
LoginId: kly2 Corp: 01 Fleet: 007777

[ ] [◀ Prev.] Order Status Menu ▽ [Next ▶]

Please select the appropriate retrieve option:

Country    Fleet
[01 (USA) ▽]  [007777]

⦿ Order Number:
  [80544-1]   [Search]

○ Unit Number:
  [         ] [GE Unit ▽] [Search]

○ VIN Number: (Complete VIN or last 8 digits only)
  [         ]

○ Log Number:
  [         ]

Now Available - Detailed Order Status Reports: Now you can access order status for all of your fleet's pending orders through our comprehensive, online Fleet Reporting application. Fleet Reporting can be accessed through *Your Office @ Fleet* main menu page.
If you do not have access to Fleet Reporting, call your Account Manager

GE Capital Fleet Services — Vehicle Ordering

Exit | Contact Us | Help | Account Info
LoginId: kly2 Corp: 01 Fleet: 001549

[Prev.] Change Password

---

Enter the following information to change the password:

User ID:         kly2

Old Password:    [     ]

---

New Password:    [     ]

New Password (again): [     ]

[ Change Password ]

Note: The new password must be 6 to 8 character in length, with at least 1 character being non-alphabetic. Examples of a <u>valid</u> Passwords are: Hayride1, pass#wrd, 5test3%

Do not use your name, or any part of it to form your new password. This greatly diminishes the security of your account.

GE Capital Fleet Services

Vehicle Ordering

Exit | Contact Us | Help | Account Info        ◀ Prev.  Driver History Request Form ▽  Next ▶

Driver History Request Form

DRIVER HISTORY REQUEST FORM

| Fleet Name: _____ | Fleet # _____ | PRE-EMPLOYMENT |
| Requester Name: _____ | Unit # _____ | URGENT REQUEST |
| Address: _____ | Employee # _____ | **ADDITIONALLY APPLY |
| City: _____ St ___ Zip ___ | Customer Ref # 1 _____ | |
| Phone #: ( ___ ) _____ | Customer Ref # 2 _____ | Return by Mail |
| Fax #: ( ___ ) _____ | | |

*To Be Completed by Vehicle Operator*

(Please Print)

NAME: Last_____ First_____ MI _____

Date Employed: M/D/Y: ___/___/___    Birth date: M/D/Y: ___/___/___

Driver's Lic. #: _____ State: _____ Soc. Sec #: ___-___-___

Do you have, or in the past years, have you had a license in any other state(s)? No____ Yes____

If yes, list each state and driver's license #:_____

Has your License ever been suspended or revoked?

No ____ Yes ____ Please explain: _____

In the past 5 years, have you been involved in an accident where a police report was filed or which resulted in injury? Or have you ever had insurance denied or canceled or your premiums increased based on your driving No____ Yes____ Please explain: _____

*FIG. 25*

By signing below, I hereby authorize Gelco Corporation d/b/a GE Capital Fleet Services or its designee periodically to obtain any and all information in my driving record, and to use such information as directed by the company stated above or to release the information to the company or its designee. I acknowledge, if I am an employee or an applicant for employment, that this information may influence a decision on my employment. I agree that this authorization is effective immediatley and will continue until I notify GE Capital Fleet Services in writing that I withdraw this authorization I certify that my employer has provided me with a separate written notice stating that it may periodically obtain my driving records for the purpose of making determinations related to my employment. I certify that the information provided above is true and complete.

Employee Signature:_____ Date:_____

IMPORTANT: Notarization is required for the following states: GA, NE, NV, NJ, OR, UT and VT Notary Stamp Seal: Notarized by:_____ Date:_____

Return this form to:   GE Capital Fleet Services
                       Attn: Accident Prevention Program
                       3 Capital Drive, B2-4
                       Eden Prairie, MN 55344
                       Fax: (952) 828-1071

Version Date: A

*FIG. 26*

GE Capital Fleet Services

Vehicle Ordering

Exit | Contact Us | Help | Account Info
LoginId: kly2 Corp: 01 Fleet: 007777

Report: Driver Paid Options
Vehicle: 2002 Chevrolet 1ND69 Malibu Base

Report Driver Paid Options

Driver Paid Options

PAYMENT METHOD: Check
Please print this page, and send it along with your check.

DPO Details

| Option Code | Option Description | DPO amount |
|---|---|---|
| K34 | ELECTRONIC CRUISE CONTROL W/RESUME SPEED | 216.00 |

| | |
|---|---|
| DPO Total | 216.00 |
| DPO Tax Rate: 6.50 | 14.04 |
| DPO Total Amount to be paid by driver | 230.04 |

Driver information: Name: Kelly Ly
Address: 3 capital drive
City: Eden Prairie  State: MN  Zip: 55344
Phone (H):

DPO Instructions:
(this area for fleet-specific information)
Be advise that the total shown for the options you have chosen may change after you submit your order due to the following: 1) your fleet manager may not approve the option you have chosen, in which case the option will be deleted and the total charged to your card or debited from your bank account will decrease, or 2) per the manufacturer, the option may not be available for your vehicle or the price for the option may have changed, in which case your total may increase or decrease. If your fleet has allowed credit card payment as an option, you will not be notified of these changes before we charge your credit card or debit your account.

*FIG. 27*

Vehicle Ordering

GE Capital Fleet Services

Exit | Contact Us | Help | Account Info
LoginId: kly70 Corp: 01 Fleet: 007777
Forms Checklist

[Prev.] Vehicle Summary ▽ [Next]
Vehicle: 2002 Chevrolet 1ND69 Malibu Base

[Submit for Approval]

Factory Order Summary (Driver)

ABC QUALITY COMPANY
USA/007777
Order Id: ---- Revisio
Last Modified: 06/08/2001
drivermodify #: 6075

2002 Chevrolet Malibu
Manufacturer Model Code: 1ND69
FWD 4 Door Sedan
WB: 107.0    C/A: 0.0    GVW: 0
Exterior: Primary - Dark Tropic Teal Metallic
Interior: Seat/ Colors - Gray

Garaging Address:
Eden Prairie, MN 55344

Optional Equipment - Optional equipment is in addition to or replaces the Standard Equipment

| Code | Description |
|---|---|
| ISA | Preferred Equipment Group ISA |
| 92H | Seat/Colors - Gray |
|  | Spirit Cloth Seat Trim |
| 37U | Primary - Dark Tropic Teal Metallic |
|  | Paint : Exterior |
| FE9 | Federal Requirements |
| K34 | Electronic Cruise Control w/Resume Speed |

Driver Payable Amount

| Description | Price |
|---|---|
| Total payable by driver | 230.04 |

Standard Equipment - May have been replaced by Optional Equipment Selected

- Air Conditioning: Manual, Heat Ducts Rear, Rear
- AC Ducts:
- Air Bags: Driver and Passenger Front
- Alternator: 105 Amp
- Axle Ratio: 3.05

*FIG. 28*

- Battery: 600 Amp with Run Down Protection
- Brakes: Front Disc/Rear Drum with 4-Wheel
- Anti-Lock Braking System, Front Vented Discs:
- Bumper to Bumper Warranty 36 Months or 36,0000:
- Miles
- Cargo Door: Trunk
- Console Floor: Full, Box
- Corrosion Perforation Warranty 72 Months Or:
- 100,000 Miles:
- Cupholders: Front and Rear
- Defroster: Rear Window
- Doors: 4
- Drive Type: Front Wheel
- Fuel Tank: 14.8 Gal. Capacity
- Headrests Front: Adjustable
- Headrests Rear: Fixed
- Instrumentation Features: In-Radio Clock
- Instrumentation Features: Trip Odometer
- Instrumentation Gauges: Tachometer, Water Temp
- Instrumentation Warning Lights: Oil Pressure,
- Battery, Low Oil Level, Low Coolant, Lights On:
- Key In Ignition, Low Fuel, Low Washer Fluid:
- Door Ajar:
- Instrumentation: Analog
- Lights Exterior: Aero-Composite Halogen Beam
- Fully Automatic Headlamps with Daytime Running:
- Lights, Multiple Headlamps:
- Lights Interior: Dome Light, Fade
- Locks: Child Safety Rear
- Locks: Power
- Major Components Warranty 36 Months or 36,000:
- Miles:
- Mirror Rear View: Day-Night
- Mirrors Exterior: Driver and Passenger Black
- Folding Outside Mirrors, Driver Manual Remote:
- Outside Mirror, Passenger Manual Outside Mirror:
- Power Outlets: 2
- Radio Antenna: Fixed
- Radio Controls: Automatic Equalizer, with Theft
- Deterrent:
- Radio Speakers: 4
- Radio: AM/FM Stereo with Seek-Scan, Single CD
- In-Dash Mounted:
- Remote Releases: Power hatch/Trunk
- Roadside Assistance Warranty 36 Months Or:
- 36,000 Miles:
- Seatbelts: Front Height Adjustable
- Seating Capacity: 5
- Seats Driver: 4-Way Direction Control

FIG. 29

- Reclining, Fore/Aft:
- Seats Front: Bucket
- Seats Passenger: 4-Way Direction Control
- Reclining, Fore/Aft:
- Seats Rear: Fixed Bench
- Springs Front: Coil
- Springs Rear: Coil
- Steering Wheel: With Tilt Adjustment
- Steering: Power-Assisted Rack and Pinion
- Suspension Front: Independent Strut with
- Anti-Roll Bar:
- Suspension Rear: Independent Multi-Link with
- Anti-Roll Bar:
- Tire Spare: Inside Under Cargo Mounted Compact
- Tires: P215-60SR15.0 BSW Touring AS Front and
- Rear:
- Trim Floor: Full Carpet with Carpeted Floor
- Mats:
- Trim Seat: Cloth with Cloth Back Material
- Visor Door: Vanity Mirror
- Visor Passenger: Vanity Mirror
- Wheel Spare: Steel
- Wheels: Front and Rear 15.0" x 6.0" Steel Wheels
- Windows: Manual, Manual Rear Windows
- Windows: Tinted
- Windshield Wipers Front: Variable Intermittent,
- Speed Sensitive:

**SPECIFICATIONS**

- 1,000 Lbs. Max Trailer WT (Properly Equipped):
- 100 Lbs. Max Trailer Tongue Weight:
- 107" Wheelbase, 59" Front Tread Width, 59" Rear:
- Tread Width, 18.2' Turning Radius:
- 17.1 Cu.Ft. Cargo Volume, 17.1 Cu.Ft. Maximum:
- Cargo Volume:
- 190.4" Length, 69.4" Width, 56.4" Height:
- 3,053 Lbs. Curb Weight:
- 99 Cu. Ft. Passenger Volume:
- Fuel Economy: 20.0 City, 29.0 Highway
- Headroom: 39.4" Front, 37.6" Rear
- Hiproom: 52.0" Front, 52.0" Rear
- Legroom: 41.9" Front, 38.0" Rear
- Shoulderroom: 55.5" Front, 55.3" Rear Model, equipment and prices are subject to change by the manufacturer without notice.
Prices do not include license and title fees or applicable tax.

FIG. 30

WEB VEHICLE ORDERING SYSTEM

PRIORITY

This application claims priority from U.S. provisional patent application No. 60/293,318 that was filed on May 24, 2001. The entire disclosure of provisional application No. 60/293,318 is herein incorporated by reference.

FIELD

This invention relates to a method and system for ordering leased vehicles through the internet. More particularly, the present invention relates to a method and system by which a user may order one or more vehicles for addition to a vehicle fleet or to replace vehicles in the same.

BACKGROUND

When a company has an employee who requires a vehicle to perform certain duties, the company will often provide a leased vehicle for the employee's use. To obtain the vehicle, the company may utilize an internal system or may take advantage of different systems provided by different leasing companies. Internal systems may require too much maintenance time from company employees and so may not be an efficient manner of managing a vehicle fleet. External systems may not provide for enough customizable options and fleet manager input to fit the system to a specific company's needs. A continuing need exists, therefore, for a method and system which reduces the cost of maintaining a vehicle fleet and which makes vehicle acquisition simple and cost efficient.

In order to lease a vehicle, a lessee typically visits a dealer and arranges for the terms of the lease. The dealer, who typically is not the actual lessor of the equipment, may then arrange for the lease. A company leasing a vehicle for an employee may arrange for the lease or may allow the driver to negotiate directly with the dealer. In other cases, a fleet manager may have to work with the driver in order to obtain the desired car with the desired characteristics. Any of these vehicle acquisition routes may increase the cost, in time and money, for each lease. If the company desires to have several different types of vehicles, and to provide the drivers with the ability to choose available vehicle options, it may make the ordering of the leased vehicle prohibitively expensive and complicated.

Systems for ordering vehicles run by a service provider may also present problems. These provider run systems may be designed for a certain size company and only provide features suited for that size company. A need exists, therefore, for a method and system of ordering vehicles that can be customized for the needs of each company using the system. Allowing the fleet manager to change the availability of vehicles, options, upfits, and other information may allow the system and method of ordering vehicles to become more versatile and so better meet the needs of each company using the system.

An additional problem with prior systems for ordering vehicles may occur when the company does business in several different states. Each state may have different emissions controls that require different types of emission control devices. If the company orders the vehicles through one central system, a method must be in place to insure that vehicles sent to different states have the correct emissions controls. A need therefore exists for a method and system that automatically checks and insures that the correct emissions controls are fitted onto the ordered vehicle.

A need exists for an automated method and system for the ordering of leased vehicles, whether by an individual driver or by a fleet manager. This system should allow the custom ordering of vehicles with desired options and may be automated so that vehicles are automatically fitted with the correct emissions controls. The method and system should allow a fleet manager to select parameters to control which vehicles are available in addition to what vehicle options are available. The system should further allow the fleet manager, or the driver, to directly order vehicles through the internet after the parameters have been set. This system should be simple to use and should ameliorate the entire leasing process so as to provide a tool by which a cheaper lease may result

SUMMARY

One embodiment of the present invention is a method for ordering vehicles over the internet, including the ability to set available options for each selectable vehicle, the ability to organize drivers into classes, to assign class vehicle availability, and to track vehicles after they have been ordered. The method may comprise electronically soliciting from a manager the specifications for the leased equipment, displaying the options to the user ordering the vehicle, and receiving option selections from the same. The present invention may also include a method and system to insure the installation of the proper options and upfit selections.

The present invention may further comprise a method and system for the automatic selection of emissions controls for ordered vehicles, the automatic selection of the controls being selectably based on the provided garaging address of the vehicle, on the vehicle delivery address, or on the address inputted by the user.

The present invention may further comprise a method in which the fleet manager may enter parameters for vehicles of each driver class, thereby designating certain types of vehicles as available to each driver.

The present invention may further provide a method and system for notifying drivers of information relating to their fleet vehicle.

Another aspect of the present invention may further provide a system and method for the generation of reports relating to the vehicle fleet.

BRIEF DESCRIPTION OF THE DRAWINGS

FIG. 1 is a web figure representing an example main menu.

FIG. 2 is a web figure representing an example vehicle configuration menu.

FIG. 4 is a web figure representing yet another vehicle configuration menu.

FIG. 5 is a web figure representing a continuation of the vehicle configuration menu of FIG. 4.

FIG. 8 is a web figure representing a continuation of the configuration summary page illustrated in FIG. 7.

FIG. 10 is a web figure representing an example ordering page for a rapid order.

FIG. 11 is a web figure representing an example menu for the driver order management portion of the present invention.

FIG. 12 is a web figure representing an example class setup page.

FIG. 13 is a web figure representing an example format for the batch/single notification portion of the present invention.

FIG. 16 is a web figure representing an example order status menu accessible through the driver order management portion of the present invention.

Figure 17:
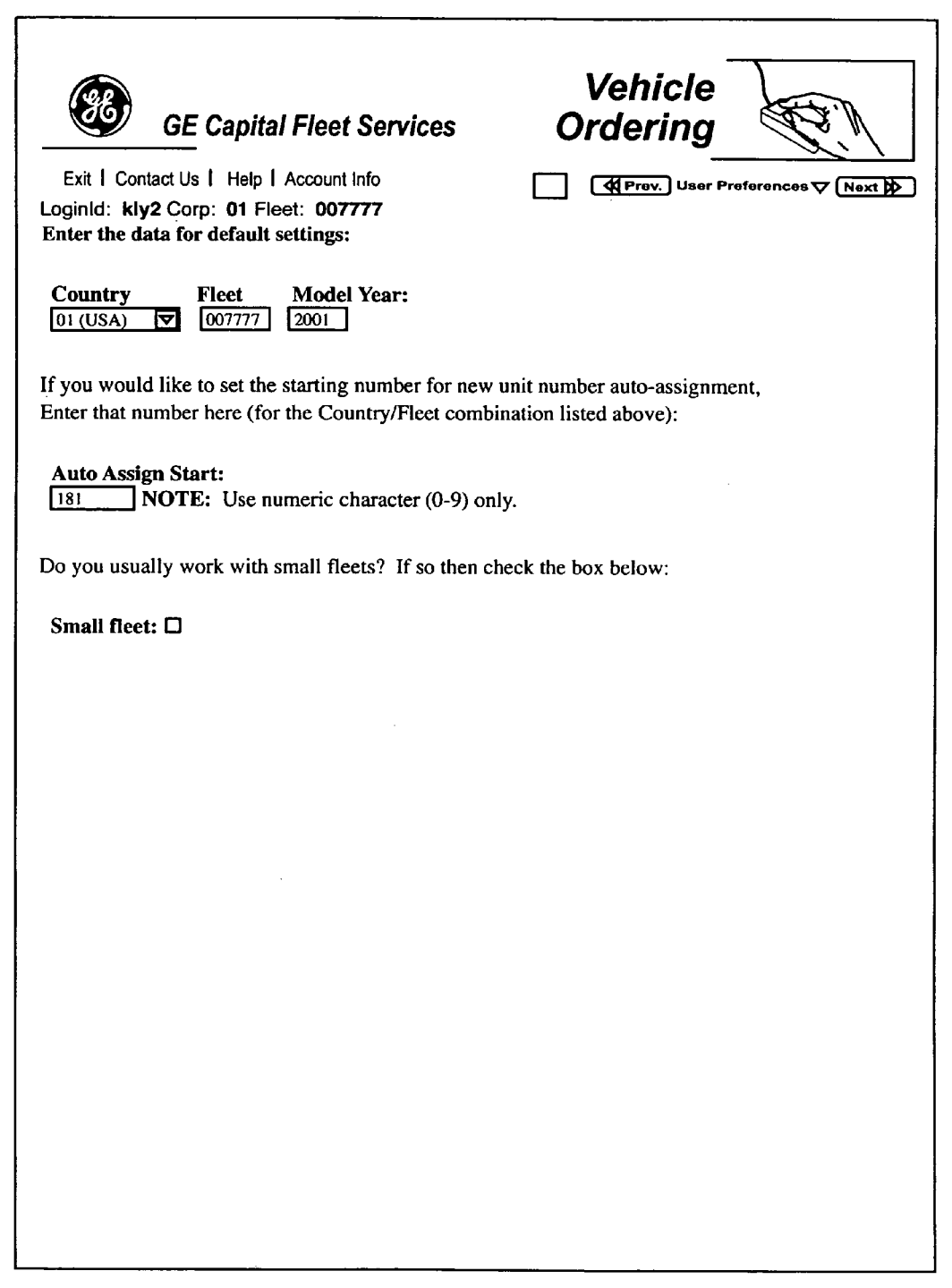

FIG. 17 is a web figure representing an example page for setting user preferences.

FIG. 18 is a web figure representing an example page for changing the user's password.

FIG. 22 is a web figure representing an example page illustrating how a driver can select a vehicle specification.

FIG. 25 is a web figure representing an example driver history request form.

FIG. 26 is a web figure representing a continuation of the driver history request form of FIG. 25.

FIG. 27 is a web figure representing an example summary of he driver paid options selected by the driver ordering the vehicle.

FIG. 28 is a web figure representing a factory order summary for the driver ordered vehicle.

FIG. 29 is a web figure representing a continuation of the factory order summary represented in FIG. 28.

FIG. 30 is a web figure representing a continuation of the factory order summary represented in FIGS. 28–29.

DETAILED DESCRIPTION

The present embodiment system and method will be described in terms of leasing vehicles, such as cars or trucks, that are part of a vehicle fleet utilized by a company or business. The vehicles may be assigned to an individual driver for his or her use, or, in alternative embodiments, the vehicles may be members of a common "pool" of vehicles that are available for general use by company employees.

As used herein, the "fleet manager" or "manager" may be the individual, group of individuals, or department whose responsibility it is to manage and maintain the vehicle fleet. The "driver" may be an individual who is leasing a vehicle for addition to the fleet. When describing those options that are only available to the fleet manager, for example, setting parameters available for different classes of vehicles, the person performing this function will be described as the "fleet manager". In further embodiments, the driver, in addition to the fleet manager, may be able to perform a certain function, for example, ordering a vehicle through the present invention method and system. In these cases the person performing the function may be referred to as a "user". In the cases where the primary function will be performed by a driver, the user will be referred to as "driver". As may be appreciated in alternative embodiments, many of the actions of the present embodiment may be accomplished by either the fleet manager or the driver.

The fleet manager or driver may work for what is described herein as a "company" or "business." The term company or business may be used to describe that entity which utilizes the vehicle fleet in question and utilizes the present invention to allow its fleet manager and drivers to order new vehicles. As may be appreciated, the company may be almost any type of organization that requires a system or method for vehicle ordering and fleet management.

In the present invention description the "service provider" may be the leasor, car company, lease company, or other concern that organizes, runs, and implements the present invention system. Finally, the present embodiment is described in terms of using the world wide web as the communication tool. As may be appreciated, other systems, such as an intranet, a dedicated communication line, or local area network may also be utilized to implement the described embodiment of the present invention.

A. General System Overview

Figure 31:
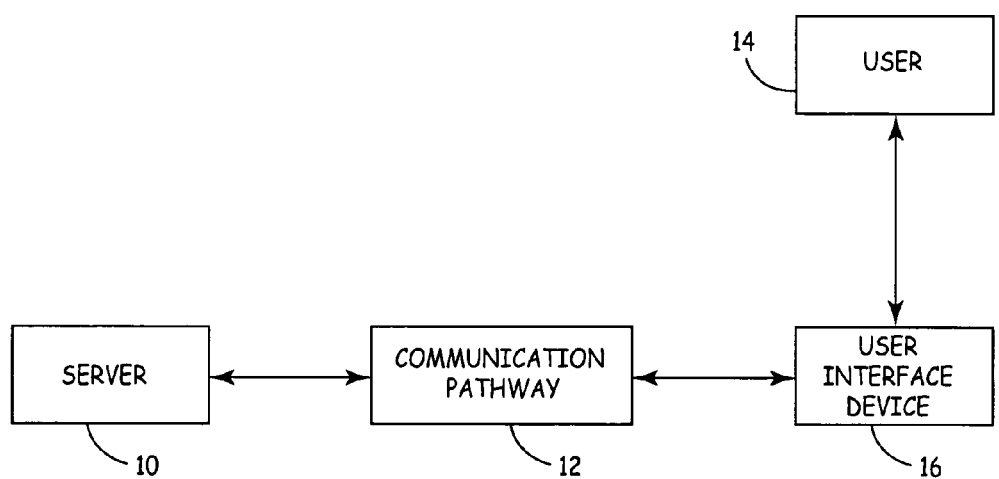
FIG. 31 is a flowchart illustrating the server environment of the present invention.

FIG. 31 is a block diagram illustration of the environment of one embodiment of the present invention. FIG. 31 illustrates a network based on a client-server model. The network comprises one or more servers 10 which are accessible by one or more user interface devices 16 such as a personal computer. The servers 10 communicate with the user 14 (the fleet manager or the driver) over a communication path 12 by using the interface device 16. The communication path 12 may be a direct dial connection, the Internet or World Wide Web ("WWW"), or other suitable telecommunications path. A suitable network protocol, such as the TCP/IP protocol, may also be used for the communications. In alternative embodiments, other communication systems may be incorporated for use with the present invention, such as telephones. Telephones may use voice interactive technology to complete various tasks required by the present invention. Those of reasonable skill in the art may substitute such a system without changing the nature and scope of the present invention.

The servers 10 may comprise Web servers and application servers, and may be any type of computer which allows access to the same. The Web server and the application server may be separate entities, or may exist within a single computer or computer system. This specification will refer to both possibilities as server 10. The server 10 may also have access, via direct dial or the Internet, to external data sources to provide complimentary services to the present invention system. For example, links to credit card services may enable the automatic payment of selected options using a credit card. It is to be understood that any number of users 14 may be connected to the server 10 at any given time.

1. The User-Side

The interface device 16 may be any conventional computer known to those skilled in the art. The computer may comprise a central processor unit ("CPU") and main memory, an input/output interface for communicating with various databases, files, programs, and networks (such as the internet), and one or more storage devices. The storage devices may be disk drive devices or CD ROM devices. The computer may also comprise a monitor or other screen device and an input device such as a keyboard and/or a mouse. In order to carry out the present invention over the internet, the computer would also need to have some software programs contained in the main memory or other storage device which can be accessed by the CPU.

For the present invention a web browser, which is a known software tool used to access the worldwide web via a connection obtained through an Internet access provider, may be part of the software programs required. A variety of browsers known to those skilled in the art may be used within the scope of the present invention. As explained above, a web server may allow access to so-called "Web sites" and "Web pages." Once the web browser has accessed these pages through the web server, the HTML page may be downloaded through the input/output interface. The central processing unit will use the browser software package to interpret the information and display it on the monitor. The software may also contain other software or programs which will allow the user to fill in information on the screens and to exchange data with the server.

The memory or the storage device may also contain configuration software. This software will enable the computer to configure the downloaded HTML Web page to make it an interactive device. The configuration software may allow a user to move from one field to another on the downloaded Web page to select options or enter usage information.

2. The Server-Side

Figure 32:
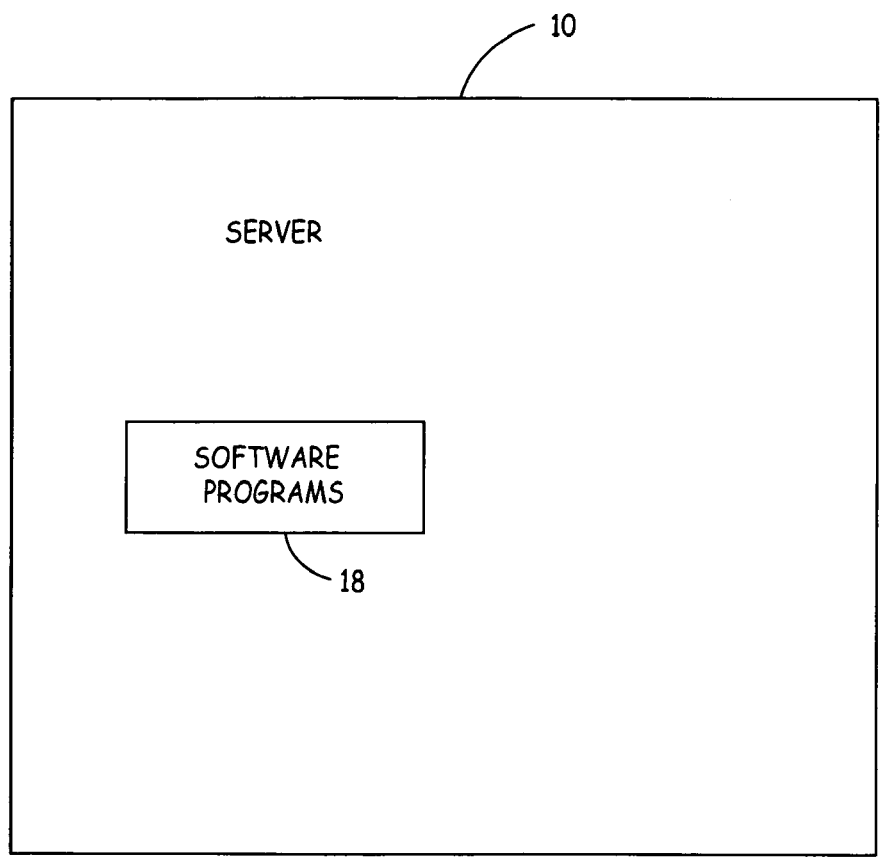
FIG. 32 is a flowchart illustrating the server of the present invention.

FIG. 32 shows the possible server 10 side of the present embodiment of the present invention. The server 10 contains programs 18 that run on the server-side to process requests and responses from the user's interface. Using the present embodiment internet connection as the interface, the server may send out web pages in HTML and/or Java script format for the user to download, interpret with his/her computer, and view on the monitor. Other formats may also be used without changing the nature and scope of the present invention.

The server 10 may further contain software programs 18 which control the interface with the communications pathway 12 of FIG. 31. The server 10 may further control the operations of the database including querying the user for vehicle selection, receiving the selections, and organizing the system. As illustrated, this specification is described in terms of a server 10, which is one integrated device. The server 10 may be alternatively set up in several different formats other than the one pictured here by those skilled in the art.

B. Operation of the Invention

1. Overview

Figure 33:
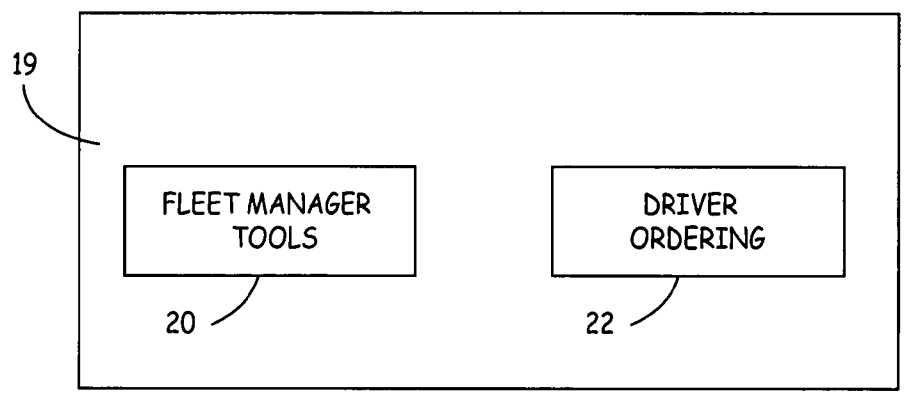
FIG. 33 is a flowchart illustrating two components of the present invention.
Figure 34:
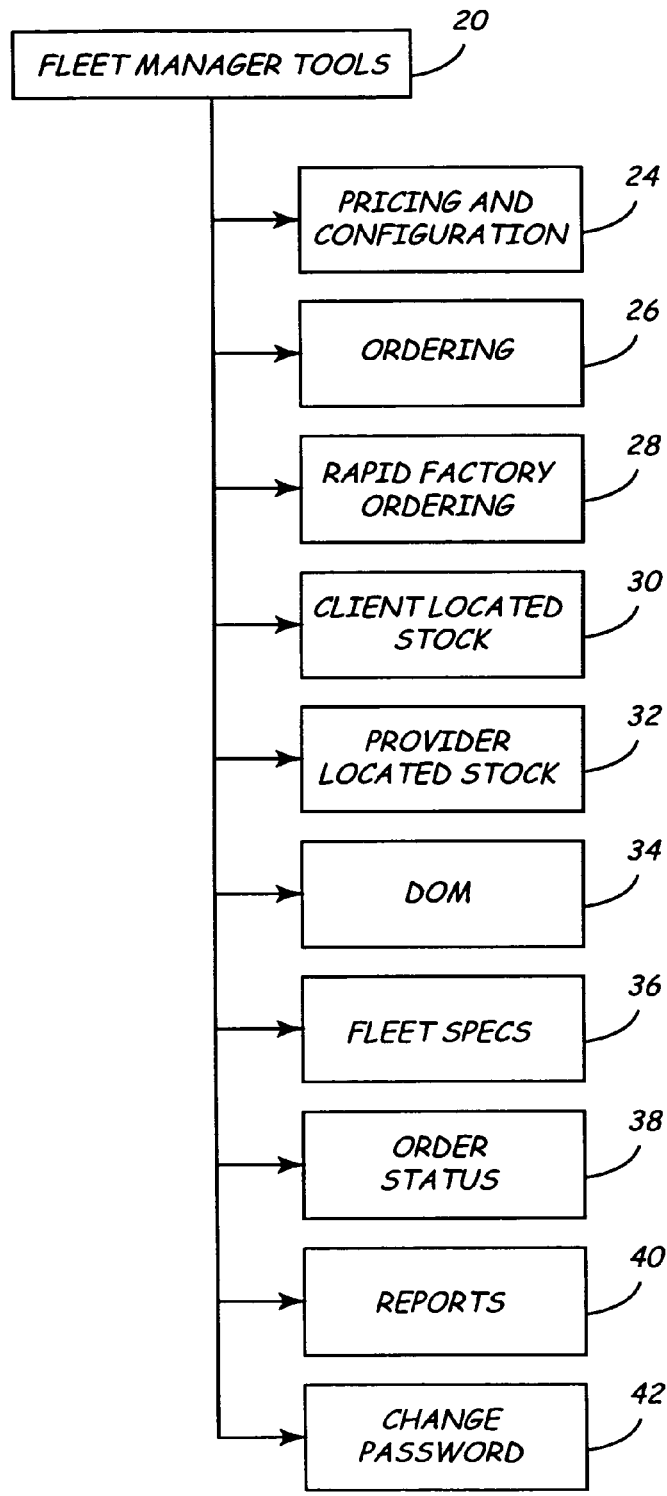
FIG. 34 is a flowchart representing the selectable options for fleet manager tools of the present embodiment of the present invention.

With reference to FIGS. 1 and 33–34, an overview of the present invention system will be herein described; afterwards, a detailed discussion of the separate facets of the present embodiment, with reference to example web pages and information provided by the same, will be discussed.

As illustrated in FIG. 33, the web vehicle ordering system 19 of the present invention may comprise two major components, a system of fleet manager tools 20 and a driver ordering system 22.

As illustrated in FIGS. 1 and 34, the fleet manager tools 20 may allow the fleet manager to pricing and configuration 24, ordering 26, rapid factory ordering 28, as well as perform other functions 30–42. In the present embodiment, FIG. 1 may only be accessible by the fleet manager, though in alternative embodiments, access to the fleet manager options may be changed to suit the needs of each company. Some of the functions 30–42 presented in FIG. 1 will be further discussed below.

As may be appreciated by those skilled in the art, the number of options available on each menu and the detail of information presented by each web figure may be quite large. The description below therefore describes the main menu items and the features that allow for the management of a vehicle fleet and for the web ordering of vehicles, describing in detail the interaction of the drivers tools. The tools may be implemented utilizing methods known to those skilled in the computer arts. Furthermore, it should be understood that a number of other accessible options and features may enhance the usefulness of the present invention without altering the nature and scope thereof.

Of particular utility in the present invention is a tool for driver order management 34 ("DOM 34"). DOM 34 may allow the fleet manager to alter the driver accessible environment of the system to insure that the vehicles ordered over the web meet with the needs and specifications of the company. The driver accessible portion of the system is further discussed herein.

2. Fleet Manager Tools

As illustrated in FIGS. 1–18 and 34–36, the steps for configuring and ordering a new vehicle type will be herein described. As illustrated in FIG. 2, pricing and configuring 24 a vehicle may further comprise building a new configuration or editing an existing configuration. As is further illustrated in FIG. 2, a new configuration or an existing configuration may allow the fleet manager to skip certain pages, select emissions (requiring an address), build a vehicle from scratch, or to select an already configured vehicle. If the fleet manager desires to select a pre-configured vehicle, the fleet manager may modify the configuration or simply check the current price. These options may be further described below.

As illustrated in FIG. 2, the present invention enables the automatic selection of the proper emission controls for the ordered vehicle. If a vehicle fleet is stationed in a state with particular types of emission laws, certain emissions features may be required on the car. Furthermore, if the vehicle fleet has vehicles stationed in a number of different states, vehicles ordered for addition to the vehicle fleet may be required to have different emission controls. The present invention may automatically insure that the correct emissions controls are installed on the vehicle. In one embodiment, the fleet manager may indicate whether the emissions controls should be referenced to the address of the driver, or, alternatively, to a separate garaging address for the vehicle. The fleet manager may also indicate a desire to skip choosing between certain selectable options, for example, FIG. 2 illustrates the option of skipping the vehicle color page.

Figure 3:
FIG. 3 is a web figure representing another vehicle configuration menu.
Figure 6:
FIG. 6 is a web figure representing a continuation of the vehicle configuration menu of FIGS. 4–5.
Figure 7:
FIG. 7 is a web figure representing an example configuration summary.

FIG. 3 illustrates an example web page which allows the fleet manager to configure a vehicle. After the user has selected the vehicle type, year, and series, the fleet manager may be queried concerning available options. FIGS. 4–6 illustrates different options that may be selected by the fleet manager for the vehicle. As may be appreciated, clicking on the box next to an option will select that option. The fleet manager may select options so that the vehicle has only those features that are desired by the company. Furthermore, the fleet manager may specify different makes, years, models, etc., for the fleet in general, or for each specific driver class. As may be appreciated, narrowing the options available to each driver reduces the time required for the driver to select a vehicle for ordering, conserving the time to the driver and cost to the company. In one alternative embodiment, the fleet manager may select a range of options from which the driver may choose when ordering his or her specific vehicle. A web page as illustrated in FIG. 7 may summarize the selected options into an estimated vehicle cost to enable the fleet manager to evaluate the assembled vehicle specification. This page may further allow the fleet manager to print a summary of the selected options.

The completed estimated cost of the vehicle, including a breakdown of the options selected, may be summarized at a configuration pricing summary page such as is illustrated in FIGS. 7–8. This page may include dealer discounts, upfit options, as well as vehicle specifications. Furthermore, as illustrated in FIG. 8, the pricing and configuration just completed can be converted to an order by selection of the 'convert to order' option. As may be appreciated, the above described configuration/pricing steps may be saved on the system if the user does not wish to proceed directly to ordering the vehicle at the time of configuration.

In the present invention the system proprietor or fleet manager may also be able to input comments relating to each driver preferred option. FIG. 4 shows an icon next to the "ADK" under "Option Packages". This icon may represent system proprietor input information for the benefit of informing the fleet manager about that option. In a similar manner, the fleet manager may input information for the benefit of the driver. As may be appreciated, the steps the fleet manager takes for selecting a vehicle, as illustrated in FIG. 4, may be very similar to the steps taken when the driver orders a vehicle utilizing the present invention (see description below).

Another feature of the present invention may be to automatically deselect options that are not available or compatible with previously selected options. For example, in FIG. 6 one particular engine paint has been selected by the fleet manager. The other paint types are no longer compatible choices and therefore the system automatically deselects the availability of these options. This feature may be particularly advantageous when a number of different options are available. If after market upfits are required, the system may be programmed to deselect those options which are not compatible with the selected or required upfit, forestalling the removal of those options and the resulting delay in vehicle delivery. The system proprietor or the fleet manager can customize different facets of this feature in order to insure that vehicles have compatible options and upfits.

Figure 9:
FIG. 9 is a web figure representing an example ordering page.

When the fleet manager decides to submit an order for a vehicle, the order may be completed as a continuation of the configuration and pricing steps discussed above, (see FIG. 8) or may be done directly from FIG. 1 by selection of the 'Order' tab. As illustrated in FIG. 9, the fleet manager may first be required to select what country and fleet the vehicle is being ordered for, whether this vehicle is a new addition or a vehicle replacement, and whether this is a new order, a copied order, or a modified non-submitted order. During the ordering process the fleet manager may be taken through screens the same as or similar to FIGS. 2–8. Each of these options may queue the fleet manager to a different screen for selection of the vehicle and other ordering steps.

As illustrated in FIG. 1, the present invention may allow the fleet manager to select a variety of methods in which to obtain the ordered vehicle. The various order types may include regular factory orders 26, client located (i.e., the drivers, fleet managers, or the company) stock orders 30, or service provider located stock orders 32. The regular factory 26 order may send the order to the manufacturer, who will then manufacture the car according to the entered configuration. The delivery of a vehicle ordered through the factory in this manner may take as much as four to six weeks. In still further embodiments, a rapid factory order 28 may utilize a standard vehicle configuration that is available from the factory in a much shorter time period. The client or service provider located stock order 30, 32 may take very little time depending on how difficult it is to locate the vehicle or if the client has already located the vehicle in question. In still further embodiments, the system may indicate that the vehicle being ordered is a replacement for a vehicle that is currently part of the fleet. Replacing a vehicle may be particularly easy because the driver information does not have to be entered again.

The client or service provider located stock order 30, 32 may be most useful when the fleet manager wants to find, or has already found, the vehicle at a dealer's lot. The options packages for these stock orders 30, 32 may be limited, but the stock orders can often effectuate almost immediate delivery since the vehicle already exists at a dealer's lot. In some instances, the system proprietor may purchase the vehicle from the dealer and then lease the vehicle to the customer. Working with the system proprietor instead of directly with the dealer may be advantageous to the customer because the customer can take advantage of the system proprietor's experience and existing working relationship with the dealer, thus the system proprietor may be able to arrange a better price from the dealer, passing on those savings to the customer.

For the standard factory order 26, the factory may take care of the options packages. An aftermarket shop may supply any upfit options the manufacturer is not able to provide.

Figure 10:
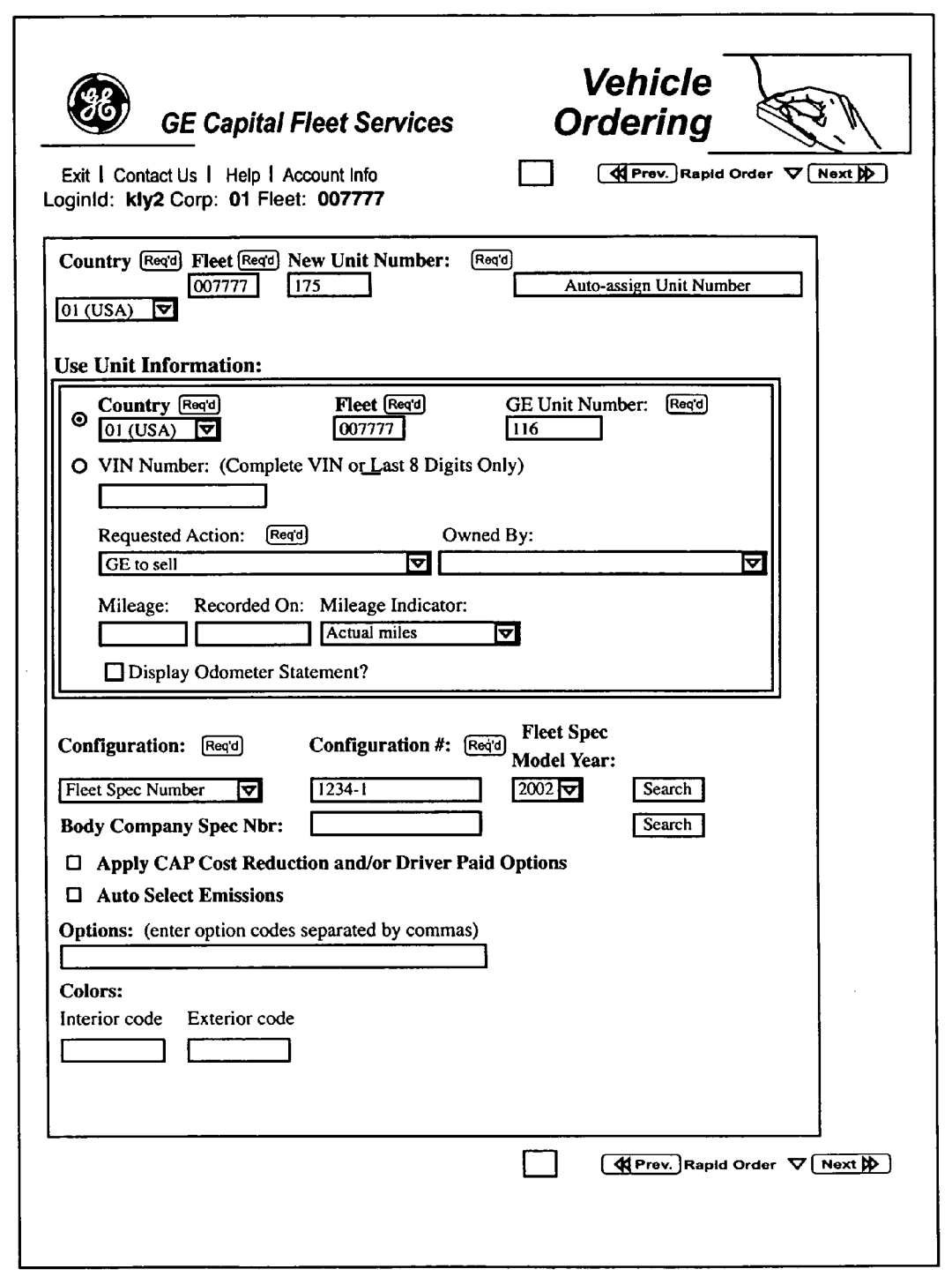

An example rapid factory order 28 may be illustrated in FIG. 10. As previously mentioned, a rapid factory order 28 may facilitate the quick replacement of the vehicle directly from the factory with or without having to go through a local dealer.

The order page illustrated in FIG. 10 may further allow for the initiation of vehicle disposal. The used vehicle information will enable the system of the present invention to initiate disposal of the vehicle in the required manner, whether by individual resale, by auction, or by trade in. As may be appreciated, the utility of the disposal information may apply equally to the regular stock order or the client and service provider orders.

Figure 11:
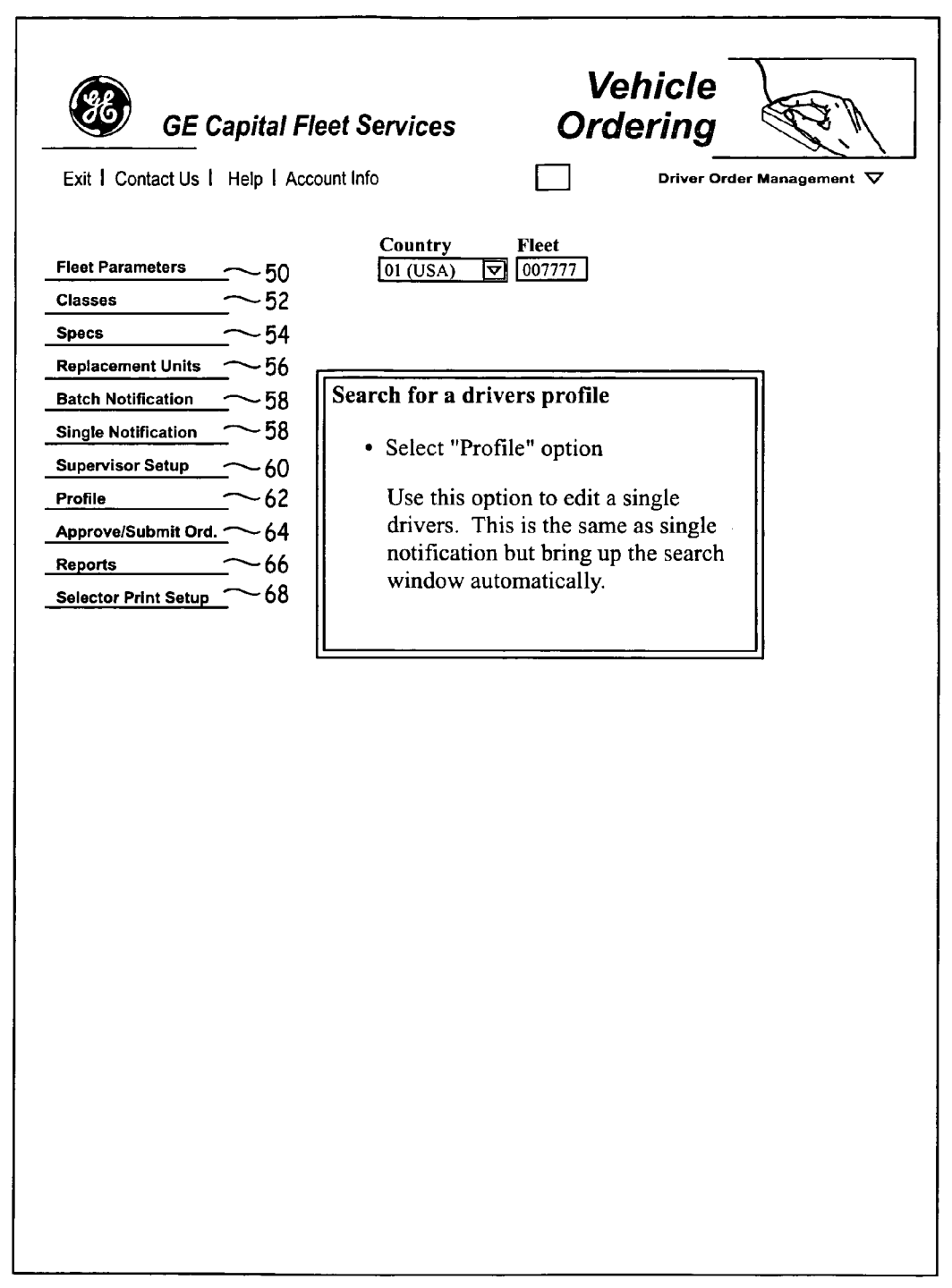

As illustrated in FIGS. 1 and 11, the fleet manager may also have the ability to set up fleet specs 36. Fleet specs 36 may set the parameters for the vehicle that are to be added to the fleet. For example, if the vehicles of the fleet all need to have a specific upfit, the fleet manager may put this fleet requirement into the present invention system.

The fleet manager options may include a page useful for the fleet manager to check an order status 38. This information may be located and presented in a number of different ways known to those skilled in the art. Further pages that may be utilized may include an order status menu (FIG. 16), a preferences page for the fleet manager (FIG. 17), or a page to change the account password (FIG. 18).

The method and system of selecting the manner in which the vehicle is located may present one advantage to the present invention system and method. If a company with a fleet of vehicles simply desires to order directly from the manufacturer, this may be automatically accomplished. If the company has the resources, or the user has the time, then the user at the company may find a dealer who presents a reasonable lease with the desired options. In still further cases, the company may simply pay a fee for the service provider to locate the vehicle.

The automatic selection of the proper emissions controls may present another advantage to the present invention. When the vehicle is ordered, instead of the manufacturer or the dealer having to take the extra step to determine the primary location of the vehicle, and from there determine the emissions requirements, the present invention enables the user to allow for automatic selection. The automatic selection saves the service provider the time and money required to insure that each vehicle is properly equipped. These savings may be passed on to the company leasing the vehicle. Automatic emission selection also reduces the time wasted returning or re-outfitting vehicles that do not have the proper emissions controls installed before delivery.

3. Driver Order Management

With reference to FIGS. 11 and 34, and with reference to the various information contained therein, the DOM 34 of the present embodiment will be further described. The DOM 34 is that portion of the fleet manager tool 20 that enables the fleet manager to customize the driver ordering 22 portion of the present invention. In the present embodiment, the DOM 34 may be accessible by one or more fleet managers. In alternative embodiments, the DOM 34 may be accessible by others as determined by the company or service provider.

The fleet manager may first access the welcome page as illustrated in FIG. 1; then the fleet manager 14 may select the DOM 34 option. From the DOM 34, the fleet manager may be able to set fleet parameters 50, classes 52, specifications 54, and other options 56–68 utilizing web pages downloaded in response to the icon selected. As may be further appreciated, in some embodiments different fleet managers may have responsibility for different sections of the company's vehicle fleet and so may have access to various portions of the present invention DOM 34.

Figure 12:
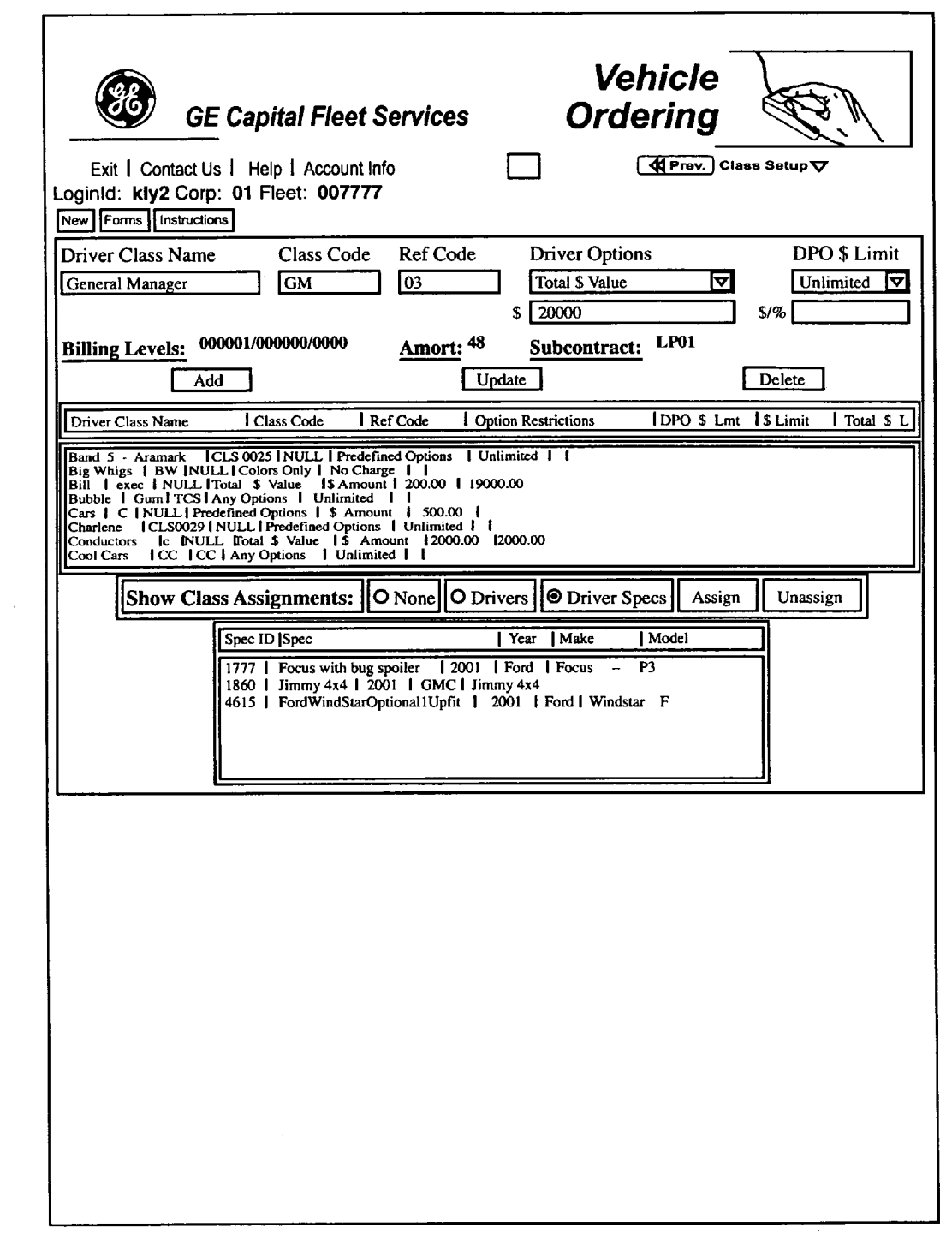
Figure 35:
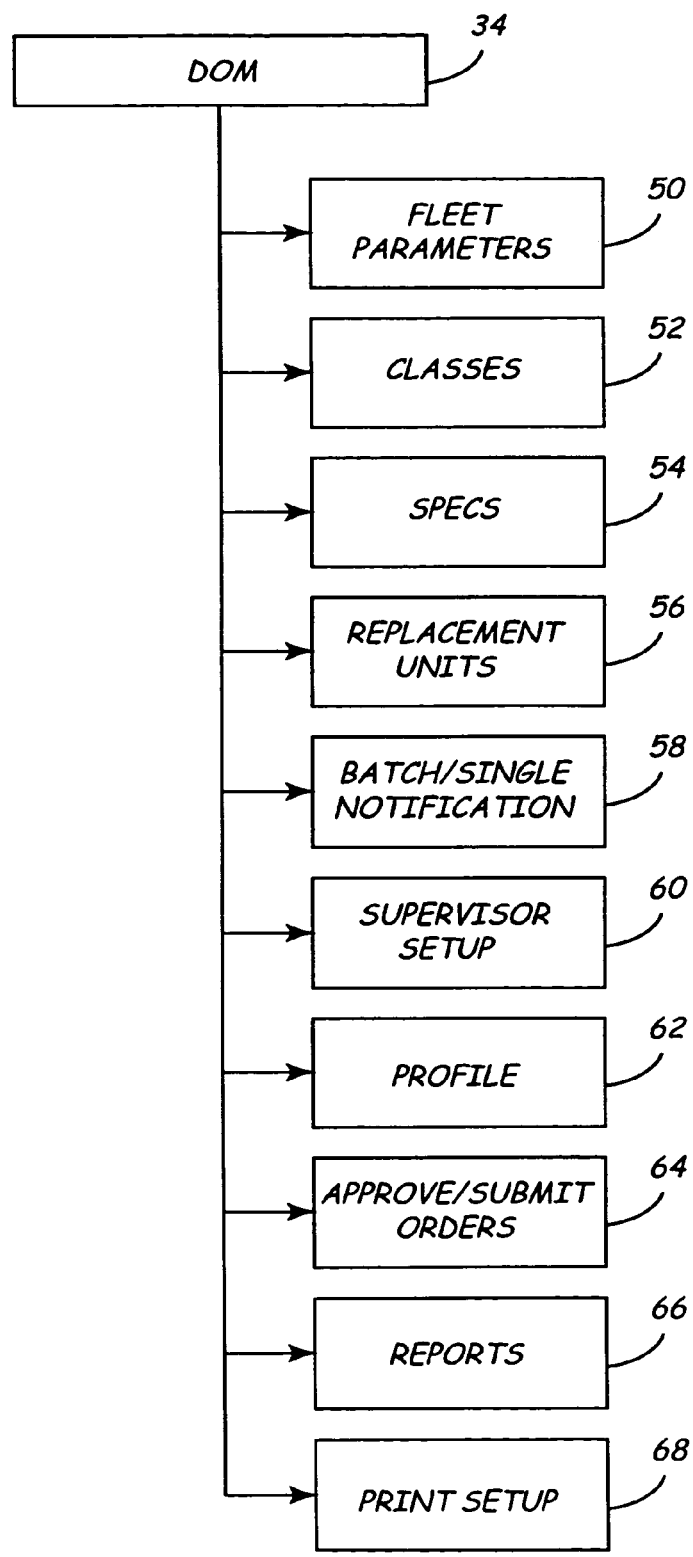
FIG. 35 is a flowchart representing the selectable options for the driver order management tools of the present embodiment of the present invention.

With reference to FIGS. 12 and 35, utilizing the DOM 34 for driver class setup 52 will be herein described. A driver class may be a set of drivers who have been grouped according to their vehicle need as proscribed by the fleet manager. Driver classes may include groups such as 'general manager' or 'sales'. For example, FIG. 12 shows a 'general manager' class with predefined options and a dollar amount that can be spent on options. The present embodiment further lists the other classes in a central section with a synopsis of the restrictions and codes for easy reference. The classes may be organized so that the fleet manager can customize the types of vehicles, options, upfits, and other selections available to each class utilizing still further web screens not illustrated herein, but easily constructed using the present invention's teachings. The fleet manager may name the class, give the class a code, implement option restrictions, as well implement other specifications. Each of these options may be performed and specifications entered by selecting an appropriate field and then inputting the relevant information.

In alternative embodiments, the fleet manager may change the parameters for an entire fleet at one time (Figure not shown). In setting up the parameters the fleet manager may restrict the fleet to certain vehicle classifications or vehicle options. Furthermore, the fleet manager may stop drivers from selecting certain upfit equipment, may require that drivers submit odometer statements, may restrict drivers from changing his or her address, etc. In addition, basic vehicle options, color restrictions, and other information may be selected and applied to the entire fleet. As may be appreciated, those skilled in the art may also incorporate the ability to change other options without changing the nature and scope of the present invention. Options may be selected by driver group, vehicle fleet, or by any other manner known in the art.

As may be appreciated, setting the fleet parameters 50, the classes 52, the specs 54, and the replacement units 56, may be done utilizing web pages similar to those illustrated in the drawings discussed above.

Figure 13:
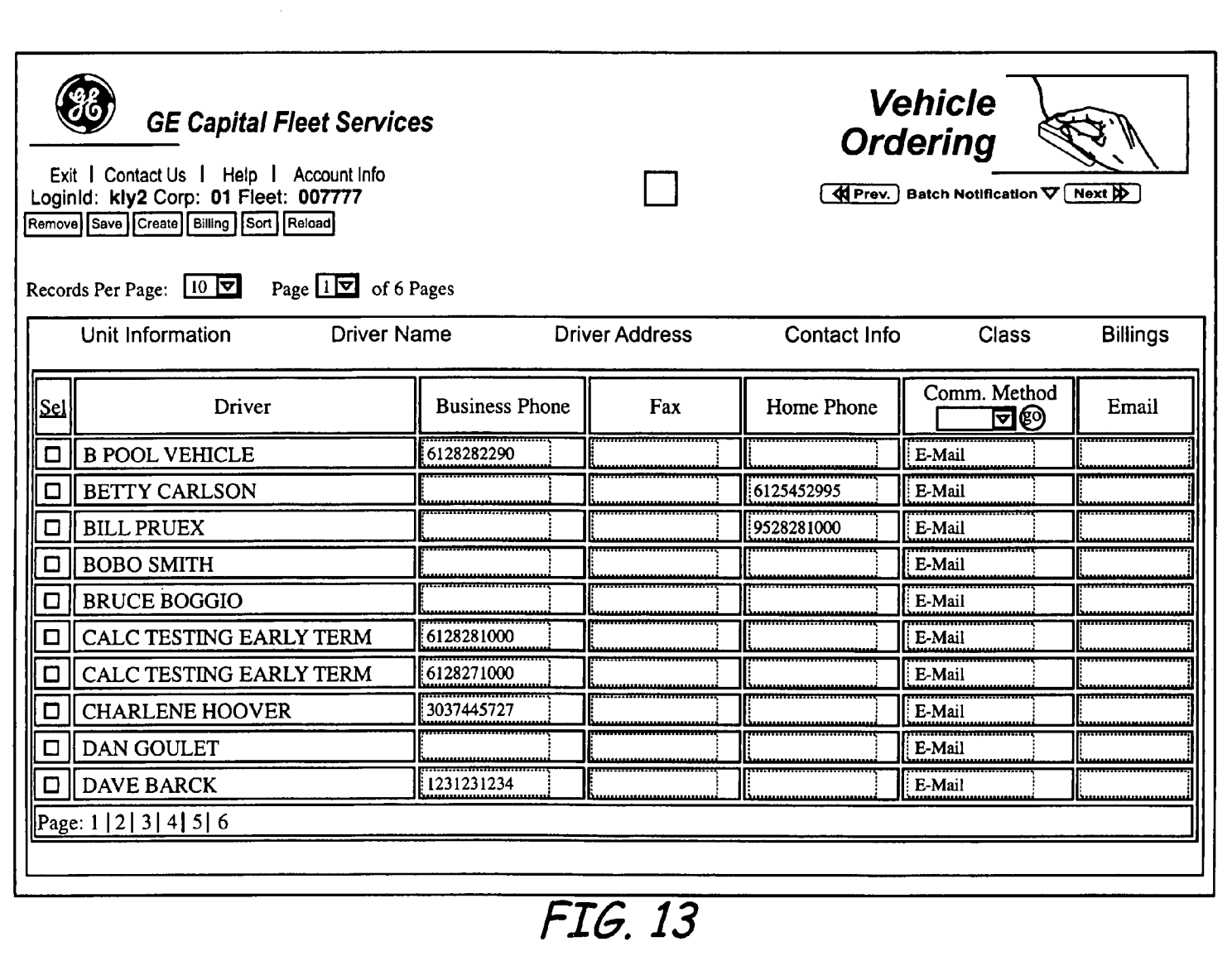

As illustrated in FIG. 13, a communication system may also be integrated into the present invention. The communication system may comprise a batch or single notification system 58 accessed through the DOM 34 menu illustrated in FIG. 11. As may be appreciated, the batch/single notification system 58 may be customized depending on the driver class or vehicle fleet. FIG. 13 may illustrate one web page that lists drivers individually by name. This web page may be utilized to display all drivers, drivers by fleet, or drivers by class. Furthermore, FIG. 13 shows mail (e-mail) as the driver notification method. This notification method may be utilized to introduce drivers to the system, to tell drivers when and how they should purchase and dispose of cars, as well as to forward to drivers instructions for the selection of driver preferred options. An introductory e-mail may inform the user his or her ID and password, instruct him or her how to use the system, and send other reminder updates as is required. The selection of either single notification or the batch notification icon 58 on FIG. 11 allows the fleet manager to select the communication system depending on the manager's needs. Other embodiments may use alternative avenues of communication and may organize the drivers in other manners without changing the nature and scope of the invention.

In addition to the notification method, the communication system as illustrated in FIG. 13 may display other information, for example, what vehicle each driver can lease, the previously used vehicle, the driver's address, option restrictions, amortization period, or other information useful to a fleet manager. Furthermore, utilizing a web figure similar to FIG. 13, options for supervisor set up 60, driver profiles 62, and approve/submit orders 64 may be accessed so that the fleet manager may perform each of these functions in turn.

The option for order approval 64 may include all of the information from the driver notification page illustrated in earlier figures, and also include further information such as emissions code, the year, make and model of the vehicle, the order status, upfit information, and the cost of the vehicle. This information may be displayed to the fleet manager, who then reviews the information and approves the lease addition to the fleet. As may be appreciated, a system and method of lease approval outside of the automatic checks of the present invention system may be advantageous in a variety of situations. Such an approval system may be helpful when a driver in a class requires special dispensation for vehicle options and upfits for which the driver's assigned class are not normally eligible. Such circumstances may be easily dealt with by the supervisor manually approving the lease instead of changing the driver's class. In this manner the fleet manager may retain more direct control over the fleet.

Figure 15:
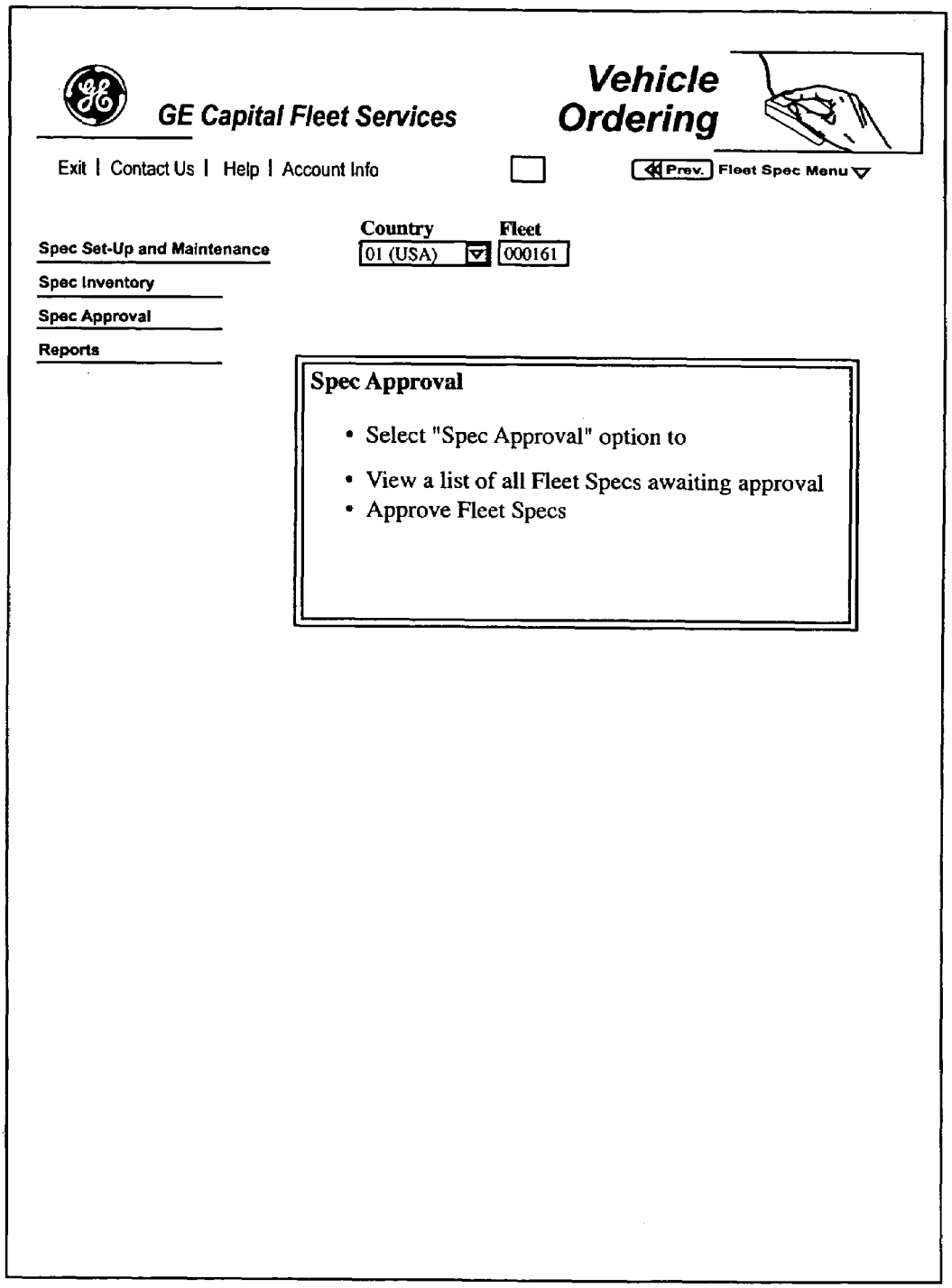
FIG. 15 is a web figure representing an example specification approval.

As illustrated in FIG. 11, the present invention may also include a selectable option for approving vehicle specifications set up by drivers or other fleet managers. In this embodiment, a user may set up the specification and those specifications are then approved by a fleet manager at a later date. A specification menu may be utilized such as that illustrated in FIG. 15. As illustrated in FIG. 15, the fleet manager may also perform specification maintenance ("Spec Set-Up and Maintenance") take an inventory of all the completed specifications ("Spec Inventory"), or may request a report relating to the different specifications entered on the system ("Reports"). As may be appreciated, each of these options may present the user with a number of additional web pages that contain a number of additional selectable options.

The driver profile 62 may allow the fleet manager to setup information, input new drivers into the system, or to edit the information relating to a single driver. In the present embodiment, the fleet manager must enter the driver information into the present embodiment system and method. In one alternative embodiment, the driver may be assigned to a class and e-mailed a driver ID number; the driver may then enter his or her personal information after entering the system. A web page similar to FIGS. 13 and 25–26 may be accessed through the DOM 34 for inputting the driver's information. As is also illustrated in FIG. 11, a link to a supervisor set up may also be available.

Figure 14:
FIG. 14 is a web figure representing an example menu for requesting reports through the driver order management portion of the present invention.
Figure 36:
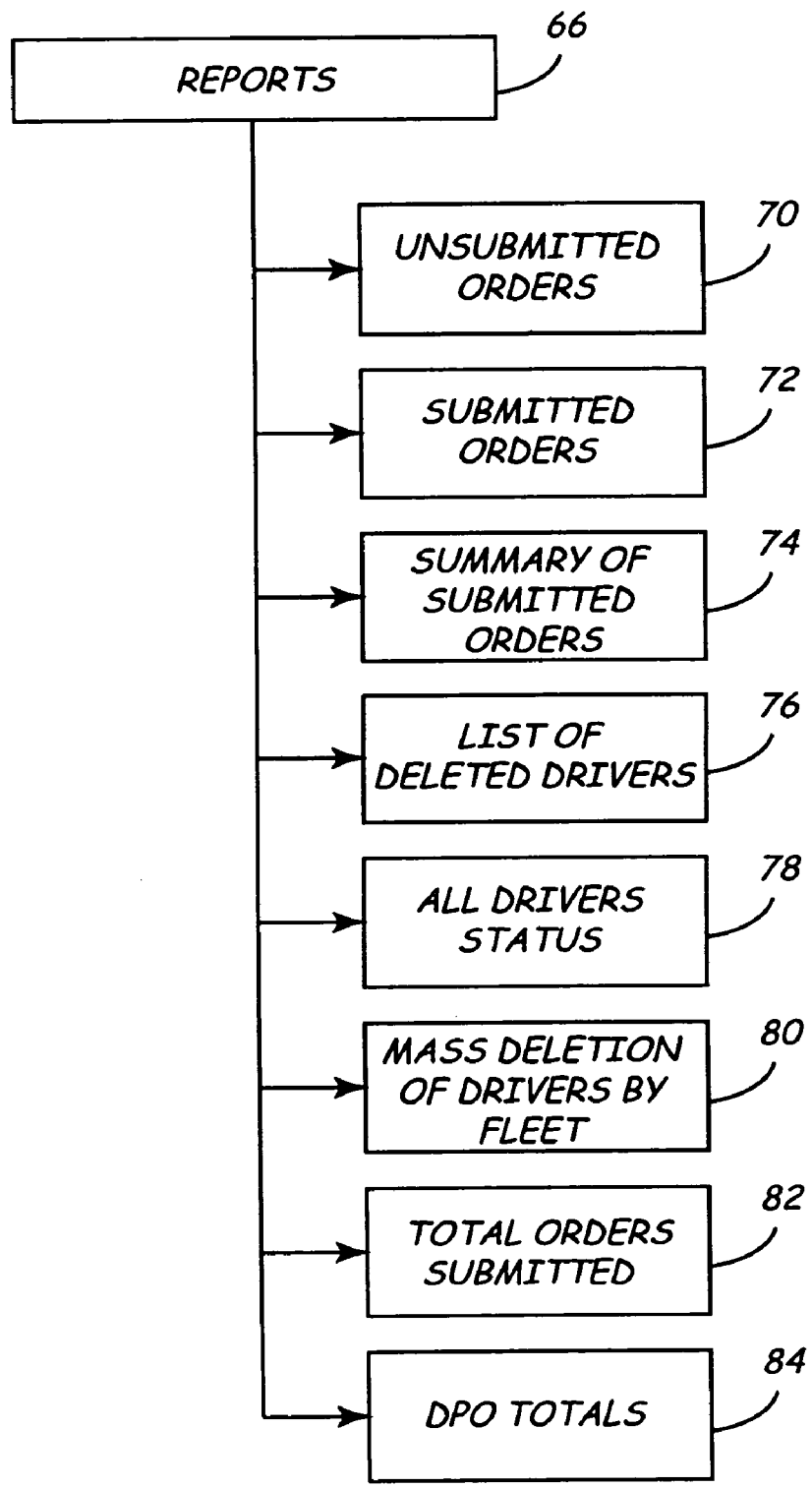
FIG. 36 is a flowchart representing the various types of requestable reports.
Figure 37:
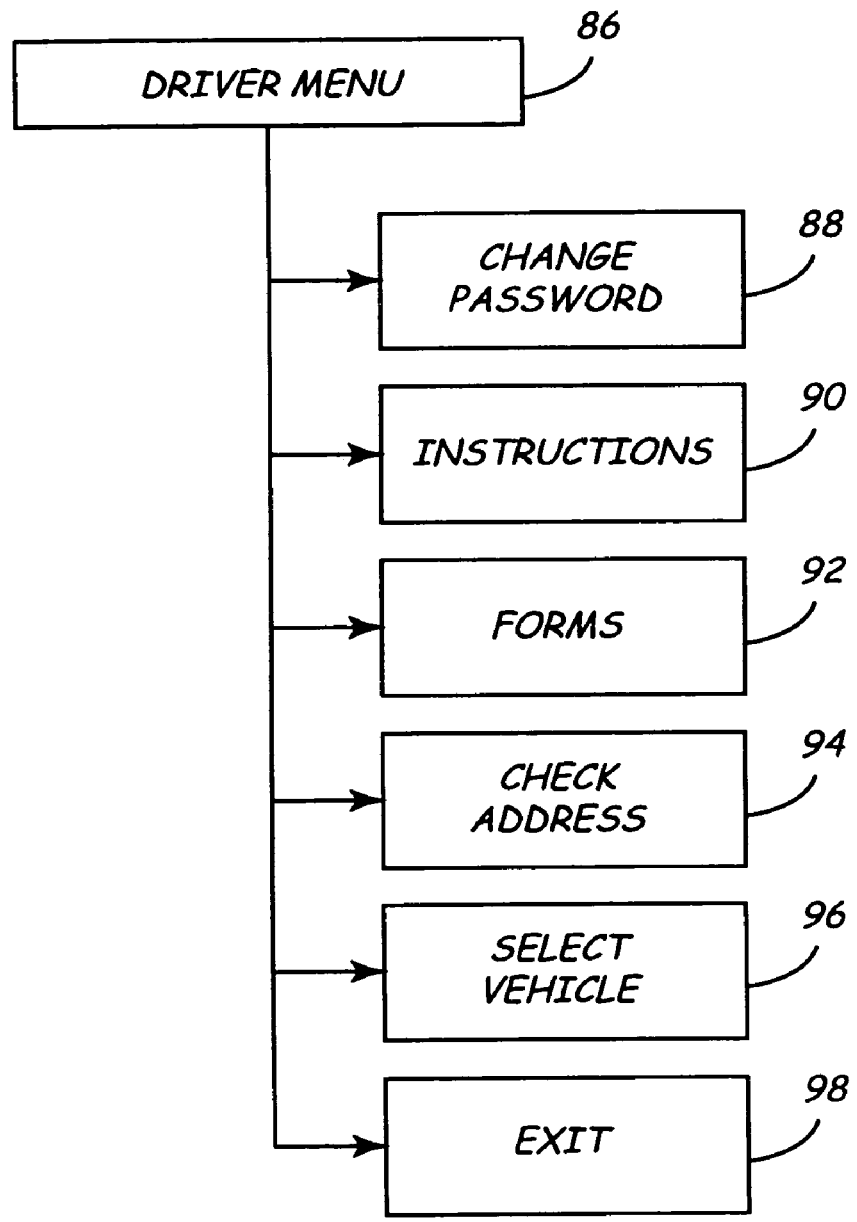
FIG. 37 is a flowchart representing the selectable options from the driver order menu of the present embodiment of the present invention.

As illustrated in FIG. 14, the DOM 34 may further include a web page useful for the generation of reports 66. Reports may be run based on the year of the leased vehicle, the type of leased vehicle, etc. As illustrated in FIGS. 14 and 36, reports 66 may also include types of information the fleet manager may find helpful, such as unsubmitted orders 70, submitted orders 72, summary of submitted order 74, as well as other information that a fleet manager may find necessary to be gathered. See FIG. 36, options 76–84.

Reports may be compiled and displayed to the fleet manager through a web page or through a printed report. FIG. 14 illustrates a web page that may be accessed in the present embodiment by the fleet manager, though in alternative embodiments this may be accessed by other users as well. Each set of information may be displayed in a spreadsheet format with relevant information displayed about each class, such as option availability and the amount of money each driver is allowed to spend on vehicle options, similar to that displayed in FIG. 13. The driver may be listed, the car that the driver has selected, the color, what upfits, and the status of the order. As may be appreciated, the type of reporting information that is useful may depend on each fleet and so may be changed depending on the needs of the fleet manager. As may be appreciated, a web page of this type may display any information in any manner known to those skilled in the art without changing the nature and scope of the present invention.

4. Driver Ordering of Vehicles

With reference to FIGS. 19–30 and 37, utilization of the present invention by a driver to order a vehicle will be herein described. The above described fleet manager tools 20, including the DOM 34, may be one part of the present invention web ordering system which allows the fleet manager to structure the underlying operation of the entire system. The rest of the system herein described illustrates how the system, with parameters set by the fleet manager, may be used by drivers to order vehicles. As may be appreciated, many of these features may be similar or the same to features already described in the fleet manager portion of the present invention. The above description of the fleet manager portion of the present invention is therefore incorporated herein to avoid repetitious description. In the present embodiment, the fleet manager or the driver may be able to configure and price new vehicles for ordering, though in alternative embodiments the driver may be restricted to only selecting pre-configured vehicles customizable with those options the fleet manager has selected.

Figure 19:
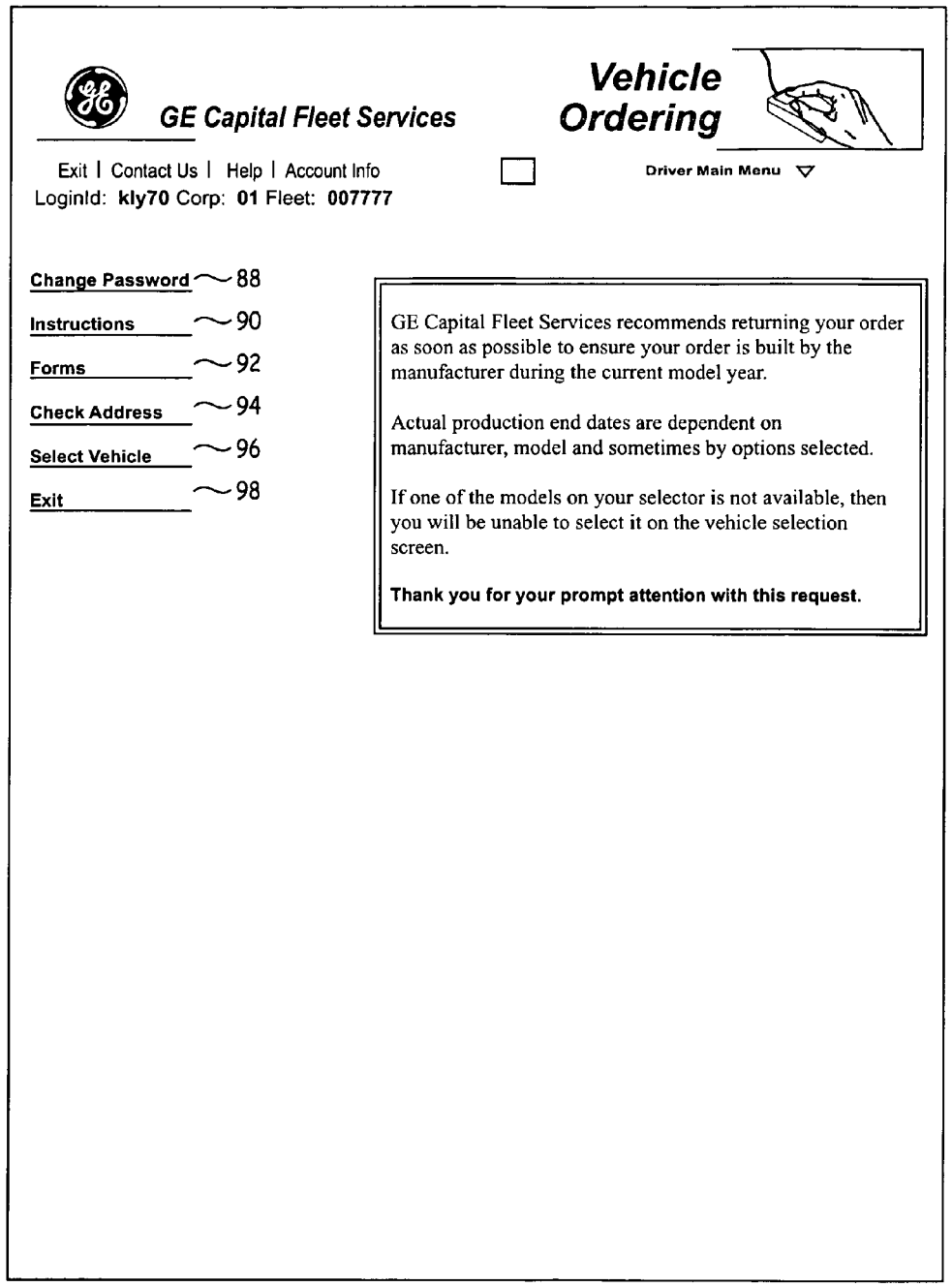
FIG. 19 is a web figure representing an example main menu page for the driver ordering portion of the present invention.

Web FIG. 19 illustrates an example driver menu 86/welcome page that may be presented to the user. Web FIG. 19 may solicit the user to choose from a number of available options, including changing the driver's password 88, instructions 90, forms 92, checking the driver's address 94, selecting a vehicle 96, or exiting 98. The options available to each user may be linked to the user's identification and password. As may be appreciated, the drivers for some fleets may be able to check pricing and configuration, reports, etc., without changing the nature and scope of the present invention.

Figure 20:
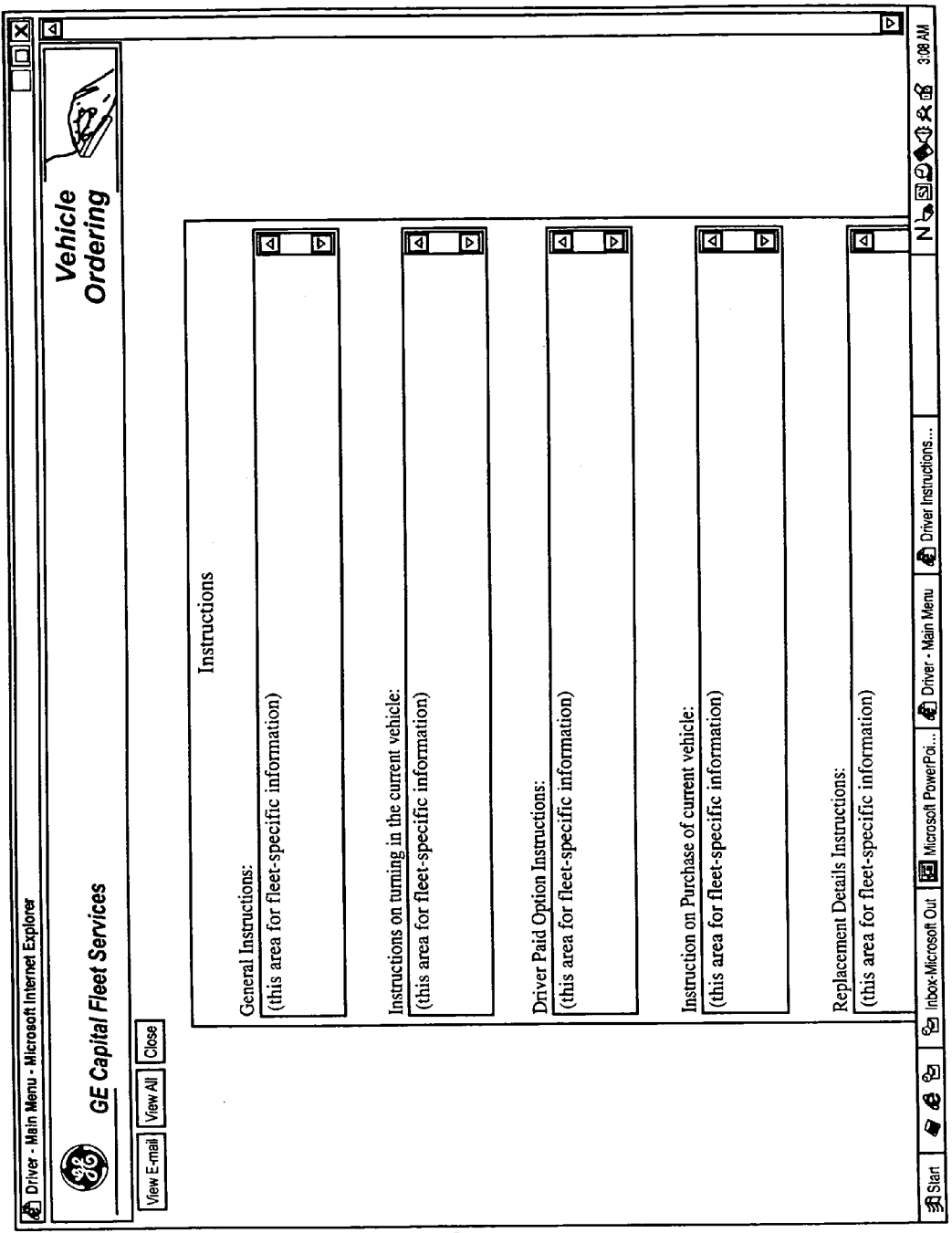
FIG. 20 is a web figure representing an example menu for inputting instructions.

The driver may be provided with specific instructions by the fleet manager or the system proprietor utilizing a web page similar to that displayed in FIG. 20. As illustrated, the driver may be provided instructions relating to turning in a current vehicle, how to pay for driver selected options, how to purchase a new vehicle, etc. Each of these instructions may be as explicit as is desired by the fleet manager and may help the driver to more efficiently utilize the present invention.

Figure 21:
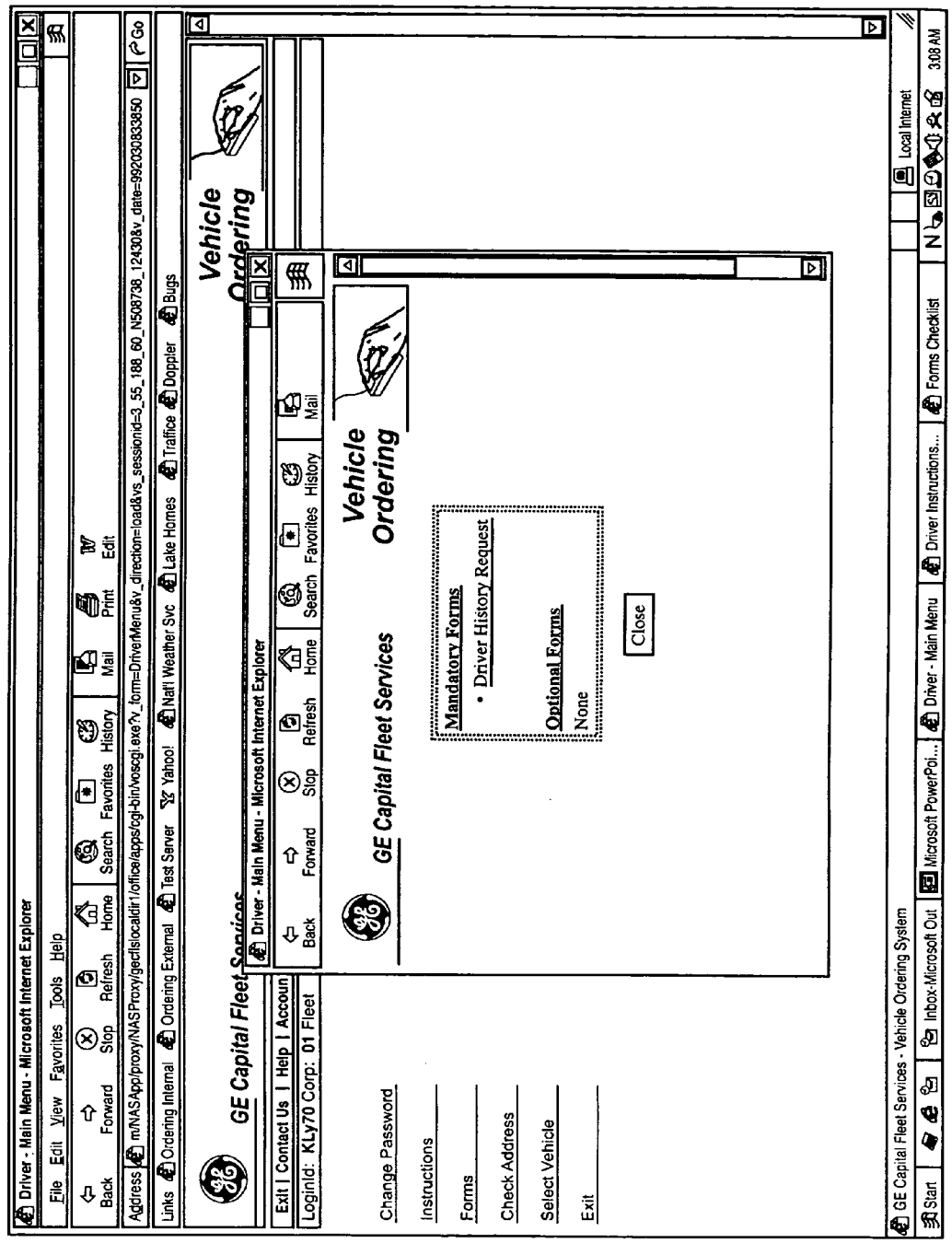
FIG. 21 is a web figure representing an example page for illustrating the forms that can be filled out through the present invention.

As illustrated by the selectable icon from FIG. 19, the driver may access a number of forms. The web page listing the forms may be illustrated, for example, in FIG. 21. FIG. 21 displays the forms by whether they are mandatory or optional. The only mandatory from in the present embodiment includes a driver history request. As may be appreciated, FIG. 21 may be changed, both in how it looks and the number of forms, without changing the nature and scope of the present invention. Clicking on the form's title as shown in FIG. 21 may cause the present invention to download the requested form to the user. The driver history request form of the present embodiment is illustrated in FIGS. 25–26 and other forms may be listed on FIG. 21 depending on the needs of the company and the fleet manager.

Figure 22:
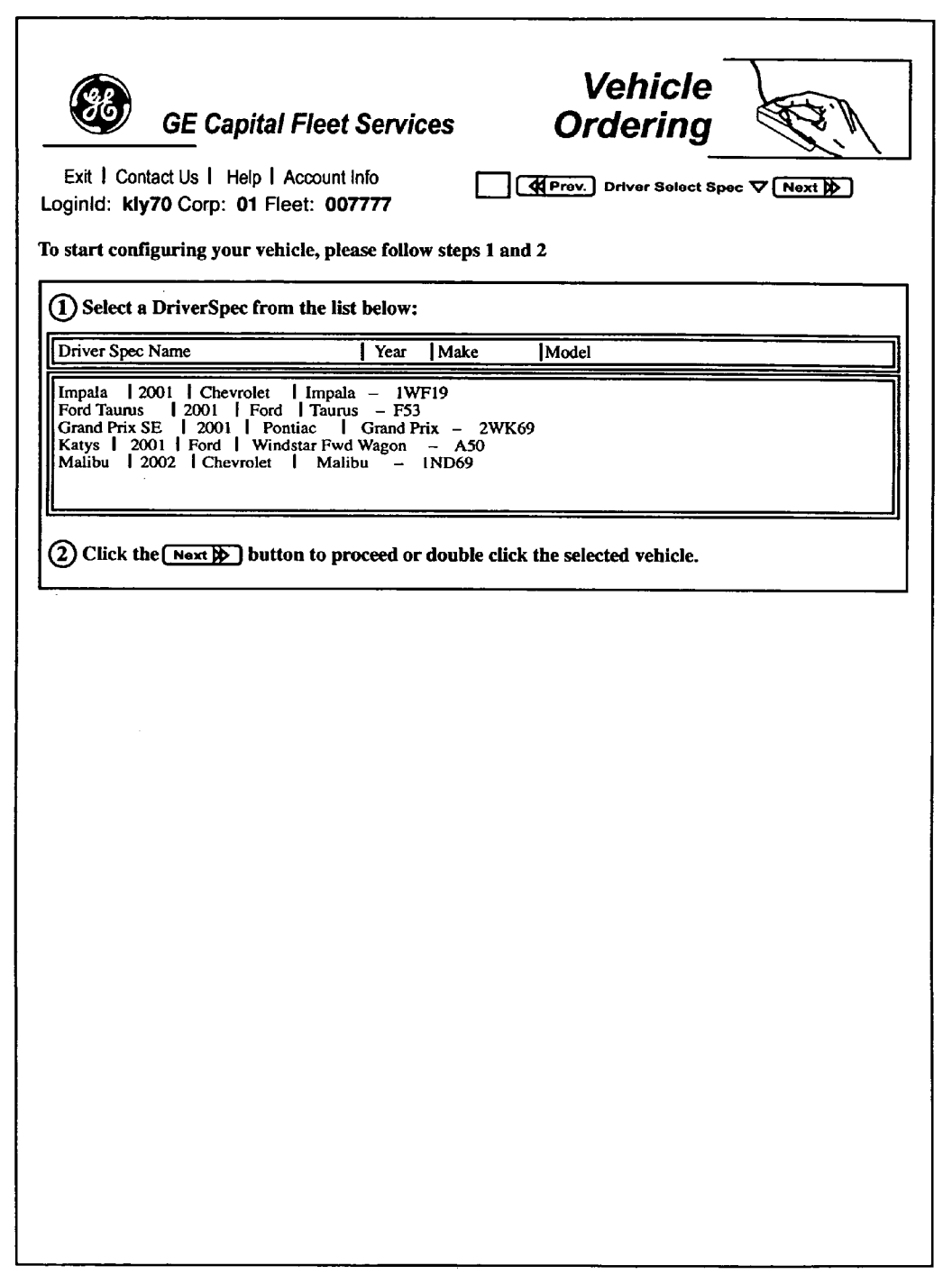

With reference to FIGS. 22–30, selection of a vehicle by a driver will be herein described. The driver first clicks on the icon for "Select Vehicle" as illustrated in FIG. 19. The first page of vehicle selection for the present embodiment may then be downloaded to the driver. See FIG. 22. In the present embodiment, the system may automatically use the driver identification number and password to present to the driver the vehicles available for selection by that driver. FIG. 22 illustrates 5 different vehicles that may be selected by the driver in the present example.

Figure 23:
FIG. 23 is a web figure representing an example page in which the driver can choose selectable options for the selected vehicle.
Figure 24:
FIG. 24 is a web figure representing a another page from which the driver can select from selectable options.

Once the vehicle is selected by the driver, the present invention allows the driver to customize those options for that vehicle. FIG. 23 illustrates the first page of selectable options for the selected vehicle. As with the fleet managers pricing and configuration options, the present invention may deselect those options that are no longer available due to other options which are incompatible with the selected option upfit. See FIG. 24.

If the driver has not yet selected the forms icon from FIG. 19, then the driver may now by shunted to FIGS. 25–26 to fill out the information required to order a vehicle.

As illustrated in FIG. 23, the company for which the driver works may not pay some of the options available to the driver. These driver selectable options will be shown along with the price that the driver must personally pay for that option. In certain instances, the driver may have an allowance from the company to purchase a certain number of these options. Once the vehicle selection is complete, and the proper forms have been filled out, the present invention may show a figure as illustrated in FIG. 27 in which the driver paid options are summarized. In the present embodiment, the driver paid options requires that the page be printed and sent along with the driver's payment. In alternative embodiments, the driver paid options may instead by paid by credit card or billed to the company for deduction from the driver's paycheck. A final summary for the order may be represented by FIGS. 28–30.

The web ordering management portion of the present invention method and system for vehicle ordering presents several advantages. The company, through the fleet manager, may be allowed to have direct control over the vehicle ordering system, bypassing the need to go to the service provider every time a change is needed. Furthermore, the system itself may be more customizable to the options and changing needs of the vehicle fleet. In alternative embodiments, leaving the customization of the system up to the system proprietor may also represent an advantage, saving expended time and effort for the fleet manager.

Another advantage results from the time and money may saved when drivers order vehicles after the fleet manager may have already narrowed the available vehicles, options, and upfits. Narrowing the options means that less time is spent ordering the vehicle, and therefore more time may be spent on work related projects.

Yet another advantage includes the ability of the fleet manager to allow vehicle ordering exceptions when warranted by special circumstances or conditions.

Yet another advantage to the present invention system and method for driver order management is the ability to automatically select the driver notifications and reminders. The system may automatically coordinate the replacement and repair of the vehicle fleet through automatic e-mail reminders. Having such a tool allows the fleet manager to be assured that the proper information is reaching the drivers in a timely manner.

The information and examples described herein are for illustrative purposes and are not meant to exclude any derivations or alternative methods that are within the conceptual context of the invention. It is contemplated that various deviations can be made to this embodiment without deviating from the scope of the present invention. Accordingly, it is intended that the scope of the present invention be dictated by the appended claims rather than by the foregoing description of this embodiment.

The invention claimed is:

1. A method in a computer system for ordering a leased vehicle for addition to a vehicle fleet comprising:

(a) electronically soliciting from a fleet manager fleet specifications circumscribing parameters of vehicles available for subsequent addition to the vehicle fleet by a driver;
   (b) electronically soliciting from the fleet manager a plurality of driver classes, wherein the fleet manager determines parameters of vehicles and options available for addition to the vehicle fleet for each of the plurality of driver classes;
   (c) electronically soliciting from the fleet manager driver class specifications for the driver class of the driver, including soliciting a selection of a vehicle and a plurality of options available for subsequent selection by the driver for the vehicle, including displaying to the fleet manager a plurality of available vehicles, allowing the fleet manager to select the vehicle from the plurality of available vehicles, further allowing the fleet manager to indicate the plurality of options available for subsequent selection by the driver for the vehicle, and allowing the fleet manager to assign the vehicle to at least one of the plurality of driver classes;
   (d) receiving from the driver a selection of a vehicle specification, wherein the act of displaying the plurality of options to the driver for selection thereof includes an indication of a subset of the plurality of options that if selected will be paid for by the driver so that the driver can further customize the selected vehicle; and
   (e) electronically receiving from the fleet manager a first change and a second change to the parameters of vehicles and options available for addition to the vehicle fleet, wherein the first change affects only vehicles or options available to one of the plurality of driver classes, and wherein the second change affects vehicles or options available to all of the plurality of driver classes.

2. The method of claim 1 further comprising automatically fitting the selected vehicle with emissions controls.

3. The method of claim 2 wherein the emissions controls are automatically fitted based upon one of the group consisting of a garaging address, a delivery address, and a manually input address.

4. The method of claim 1 wherein the method further comprises querying the fleet manager to choose from one or more of the group consisting of factory ordering, rapid factory ordering, client located stock ordering, and system proprietor located stock ordering.

5. The method of claim 1 wherein each of the selectable options displays information relating to the vehicle fleet, allows information to be entered into the system, and displays further selectable options.

6. The method of claim 1 further comprising exhibiting to the fleet manager a number of selectable options for downloading information.

7. The method of claim 6 wherein the information may be chosen from one or more of the group consisting of ordering, order status, preferences, reports, and pricing and configuration.

8. The method of claim 6 wherein the selectable options includes an option for downloading and inputting data relating to a driver order management system.

9. The method of claim 8 wherein the driver order management system further comprises a database with a number of selectable options for customizing the driver accessible environment of the present invention.

10. The method of claim 8 wherein the driver order management system further comprises a method of notifying drivers of information on a single selection basis.

11. The method of claim 8 wherein the driver order management system further comprises a method of notifying drivers of information on a batch selection basis.

12. The method of claim 8 further comprising a selectable option for the initiation of used vehicle disposal.

13. A computer system for ordering leased vehicles through the world wide web comprising:
  (a) a processor;
  (b) main memory;
  (c) an input/output interface, wherein the input/output interface communicates with databases, said databases comprising:
    (i) a fleet manager accessible database, the fleet manager accessible database including options for pricing and configuring vehicles for a vehicle fleet, for pricing and configuring vehicles for each of a plurality of driver classes within the vehicle fleet, for ordering, for formulating reports, and for managing and setting parameters for a driver accessible database;
    (ii) the driver accessible database, wherein the driver accessible database includes data defining the plurality of driver classes, data defining a vehicle and a plurality of options available for selection by a driver for the vehicle such that the vehicle is associated with the vehicle fleet and with at least one of the plurality of driver classes, wherein the driver belongs to the at least one of the plurality of driver classes, and data defining prices for the vehicle and the plurality of options; and
  (d) a driver interface device, wherein the driver logs into the driver accessible database via the driver interface device and selects the vehicle for leasing, such that the driver interface device receives a selection from the driver indicating the vehicle and one or more of the plurality of options, wherein the one or more of the plurality of options to the driver for selection thereof includes an indication of a subset of the plurality of options that if selected will be paid for by the driver so that the driver can further customize the selected vehicle.

14. The system of claim 13 wherein the driver interface device comprises a screen that allows the driver to change the driver's password.

15. The system of claim 13 wherein the driver interface device comprises a screen for downloading instructions on how to use the system.

16. The system of claim 13 wherein the driver accessible database further comprises a selectable option for downloading forms so that pertinent information about the driver may be entered into the system.

17. The system of claim 13 wherein the fleet manager accessible database for managing and setting parameters for a driver accessible database further comprises selectable options for ordering, reports, checking an order's status, and organizing reports.

\* \* \* \* \*